Inventor
Victor H. Van Sant
By [signature] Att'y.

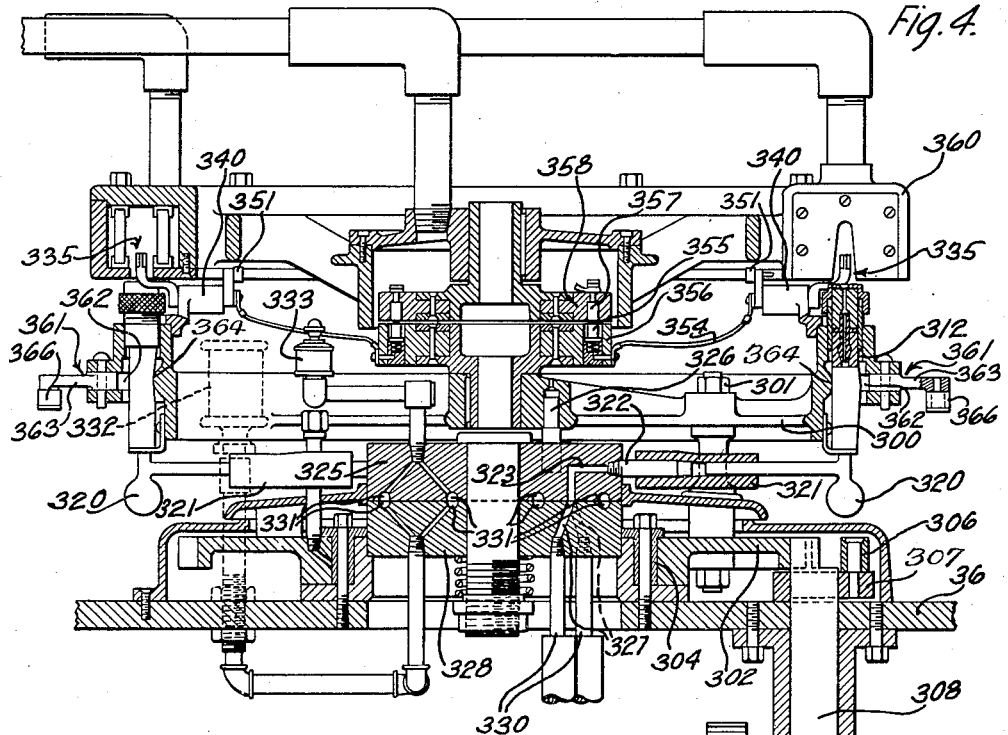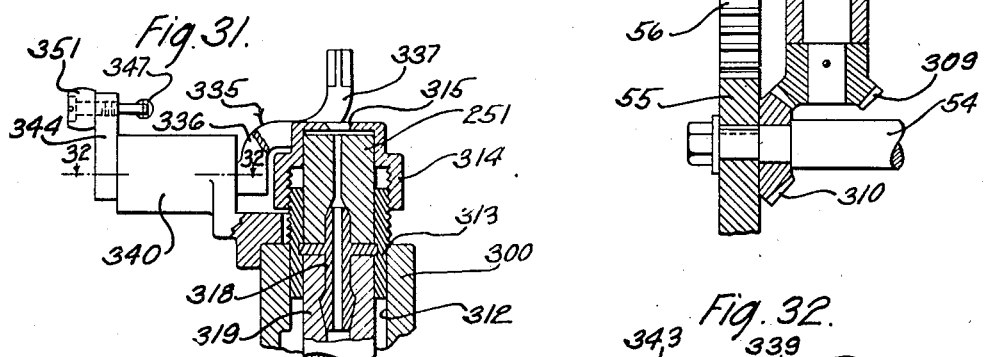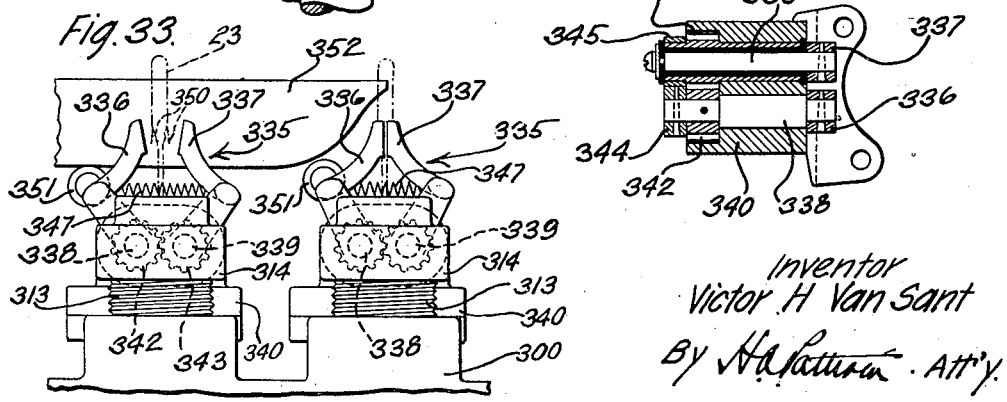

Dec. 10, 1935.  V. H. VAN SANT  2,023,628
METHOD OF AND APPARATUS FOR MANUFACTURING ELECTRIC LAMPS
Filed Oct. 10, 1929  13 Sheets-Sheet 5
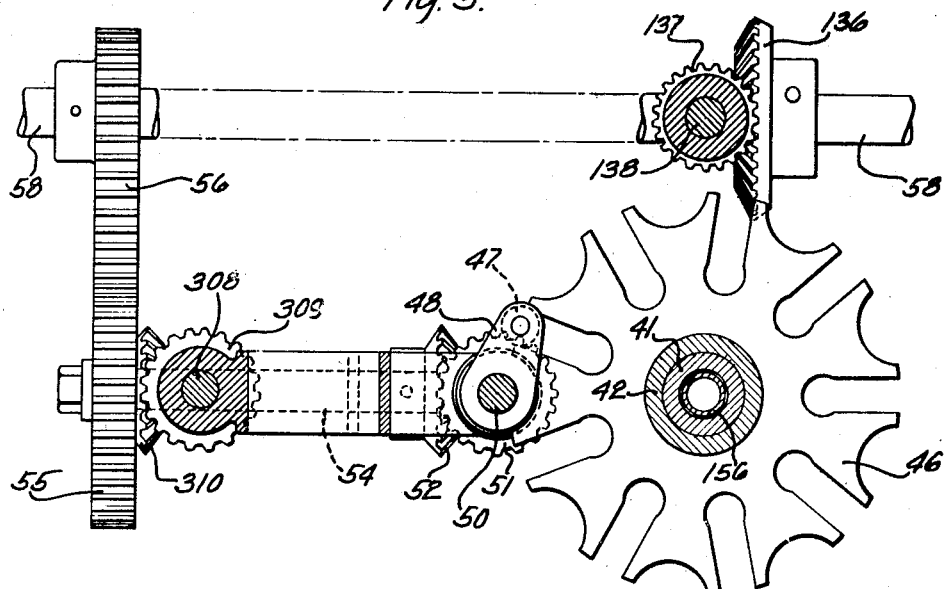
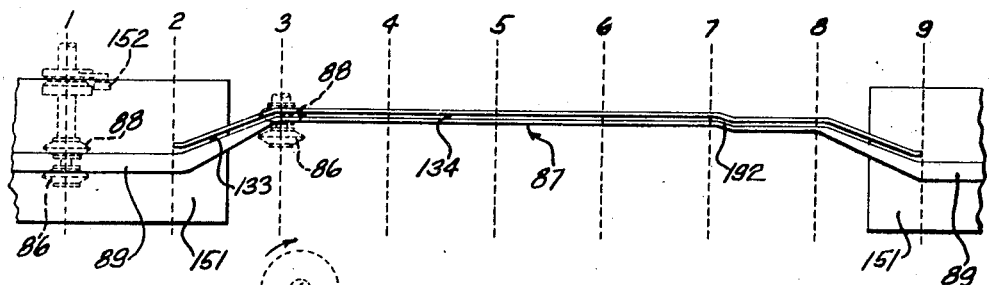
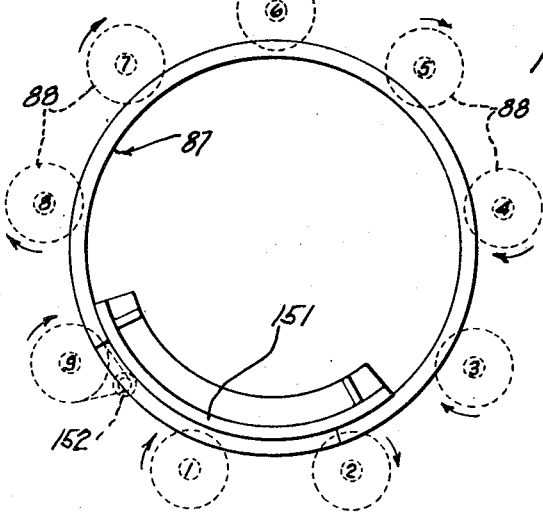
Inventor
Victor H. Van Sant
By ⟨signature⟩ Att'y.

Dec. 10, 1935.  V. H. VAN SANT  2,023,628
METHOD OF AND APPARATUS FOR MANUFACTURING ELECTRIC LAMPS
Filed Oct. 10, 1929  13 Sheets-Sheet 6
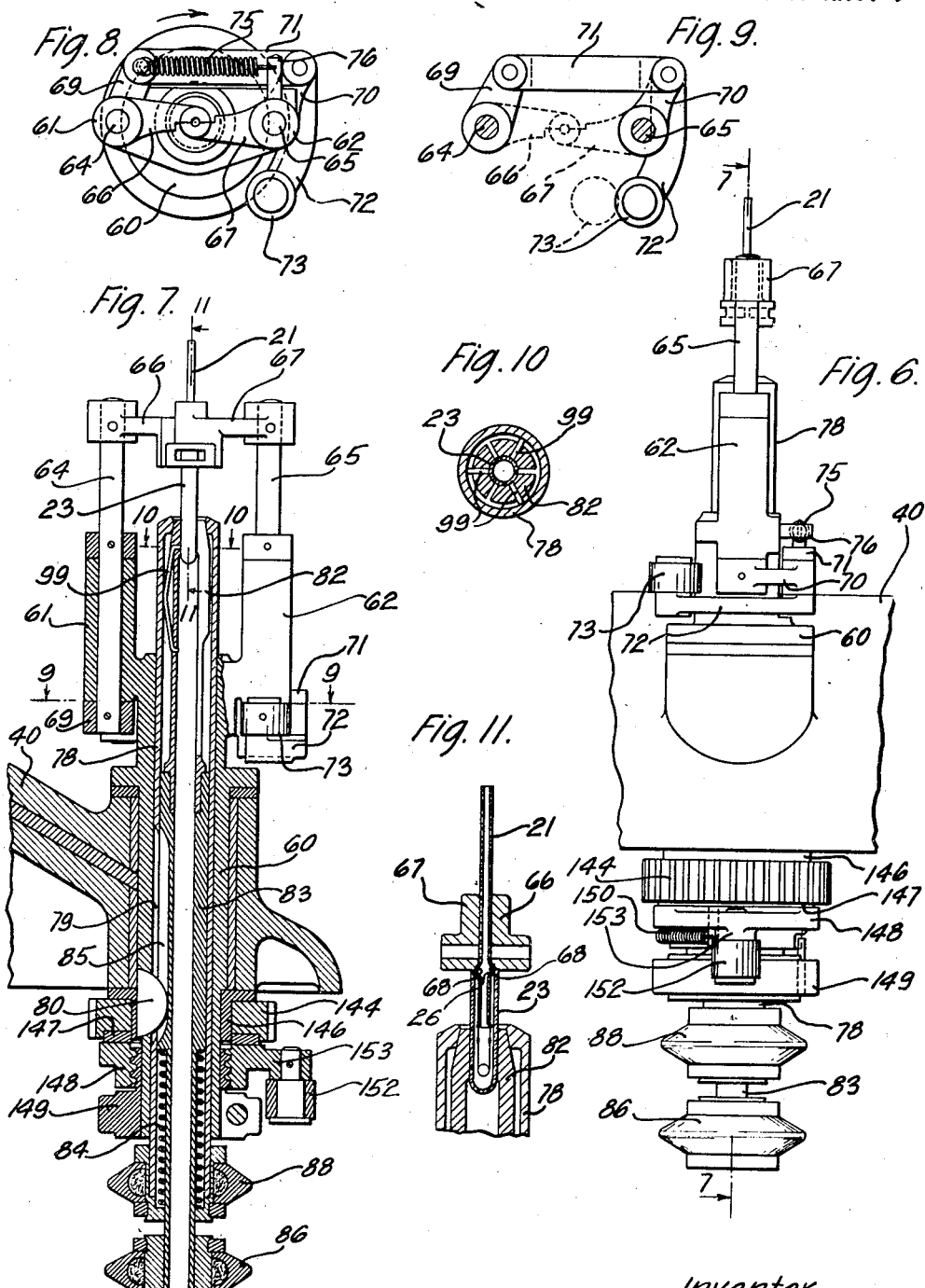
Inventor
Victor H. Van Sant
By  Patterson  Att'y.

Dec. 10, 1935.  V. H. VAN SANT  2,023,628
METHOD OF AND APPARATUS FOR MANUFACTURING ELECTRIC LAMPS
Filed Oct. 10, 1929   13 Sheets-Sheet 7
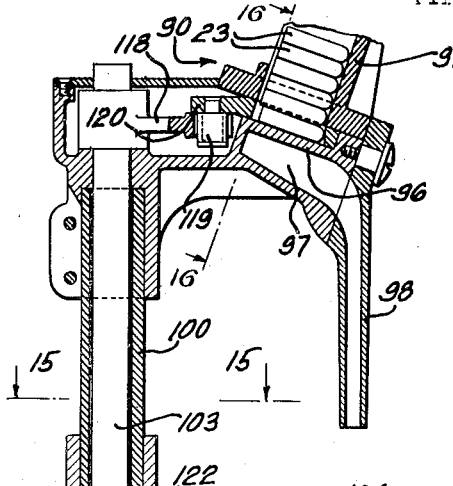
Fig. 14.
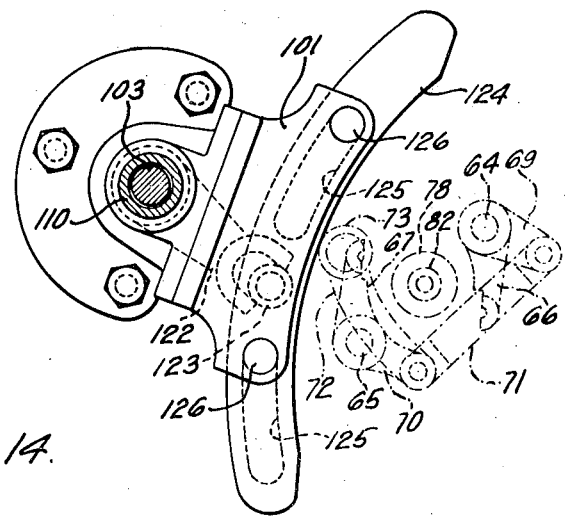
Fig. 15.
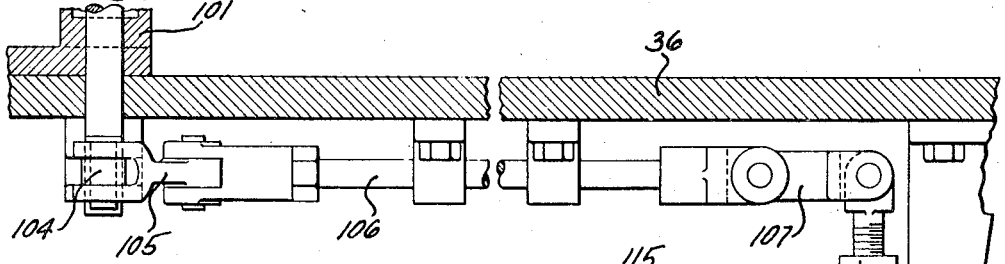
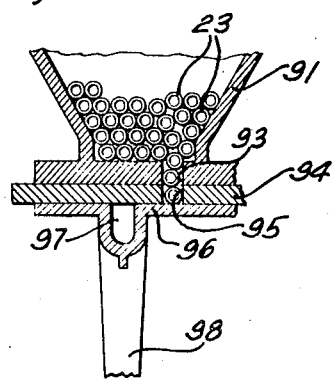
Fig. 16.
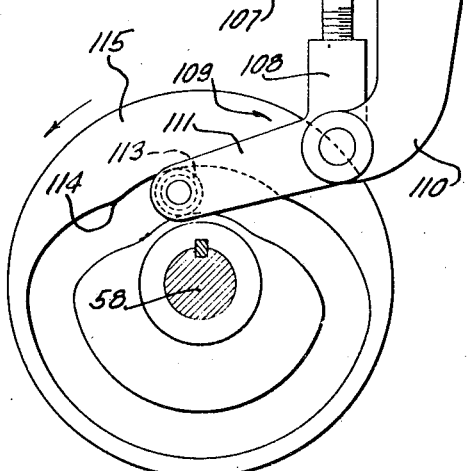
Inventor
Victor H. VanSant
By Nasaturia Att'y.

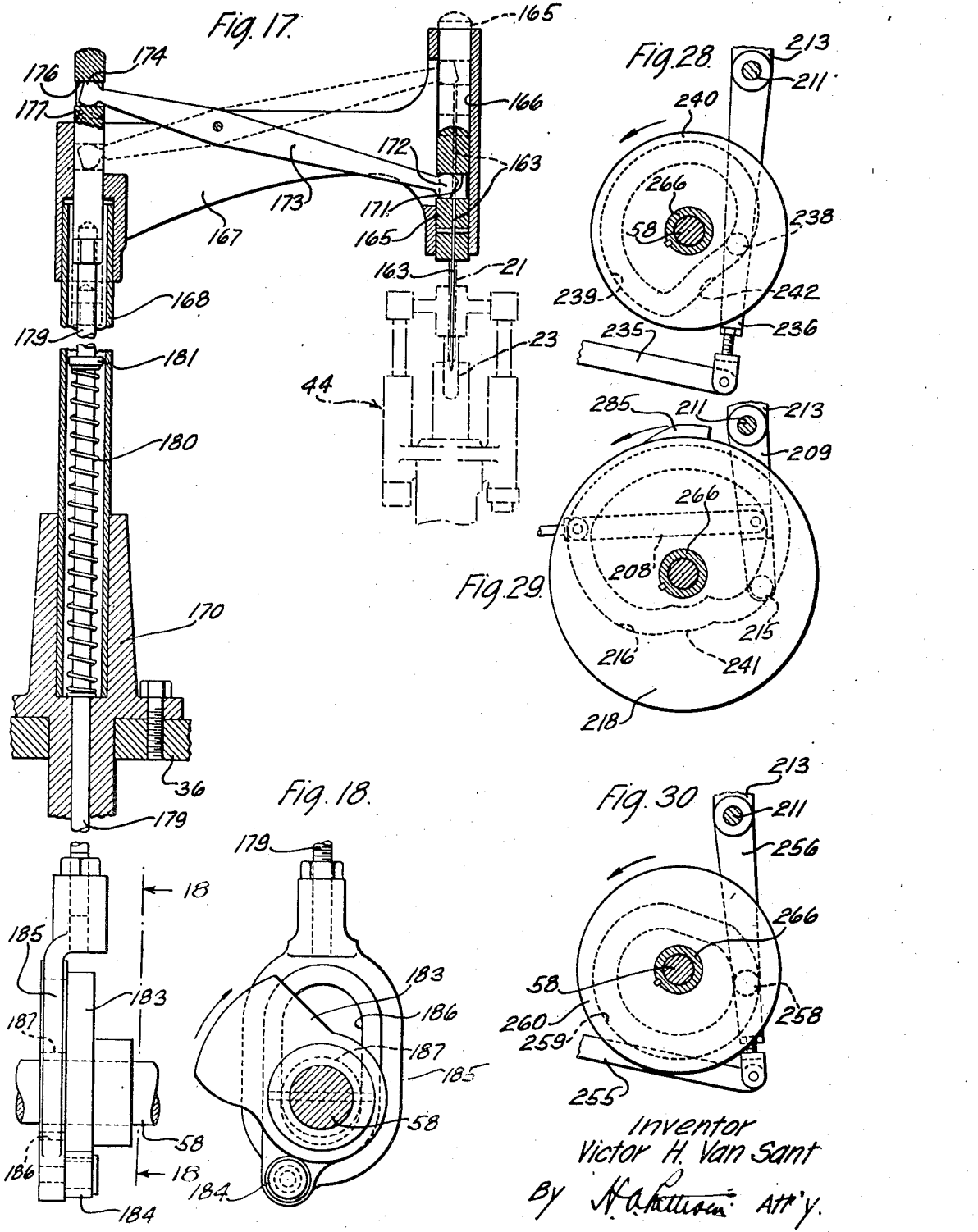

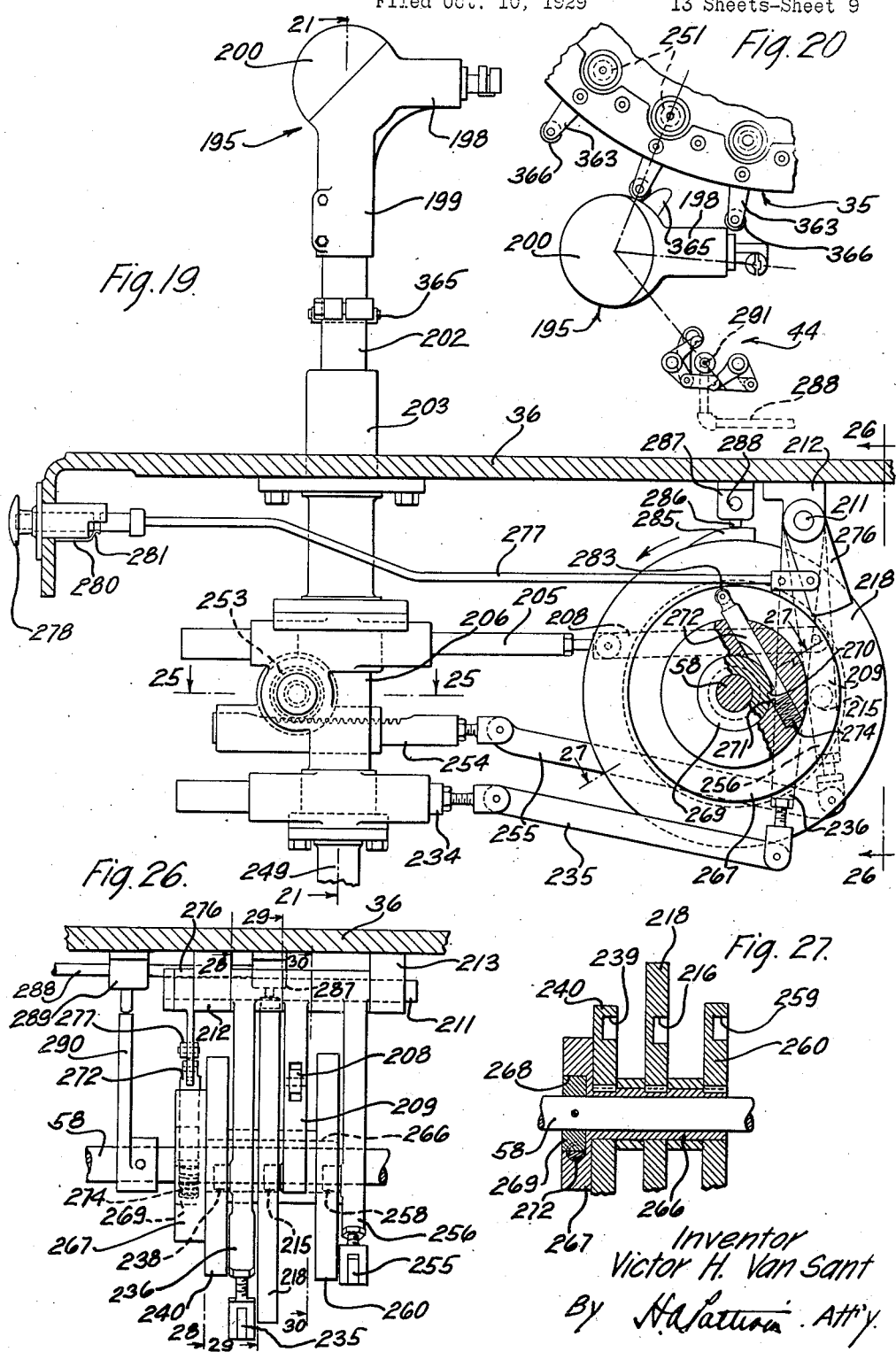

Dec. 10, 1935.  V. H. VAN SANT  2,023,628
METHOD OF AND APPARATUS FOR MANUFACTURING ELECTRIC LAMPS
Filed Oct. 10, 1929  13 Sheets-Sheet 10
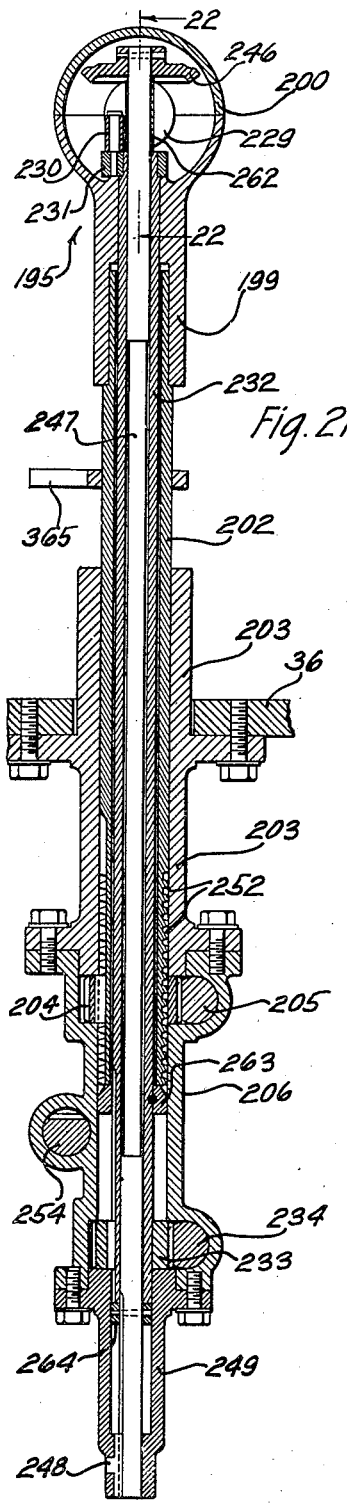
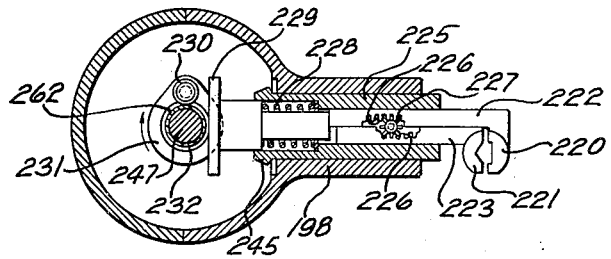
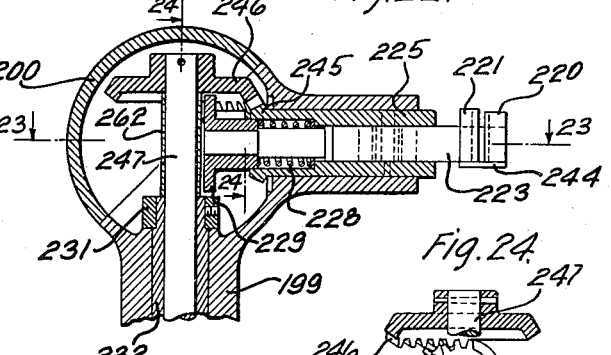
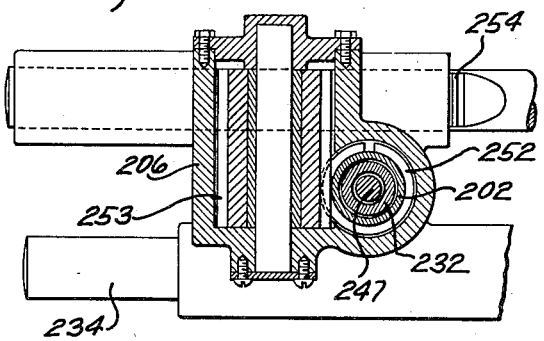
Inventor
Victor H. Van Sant
By [signature] Att'y.

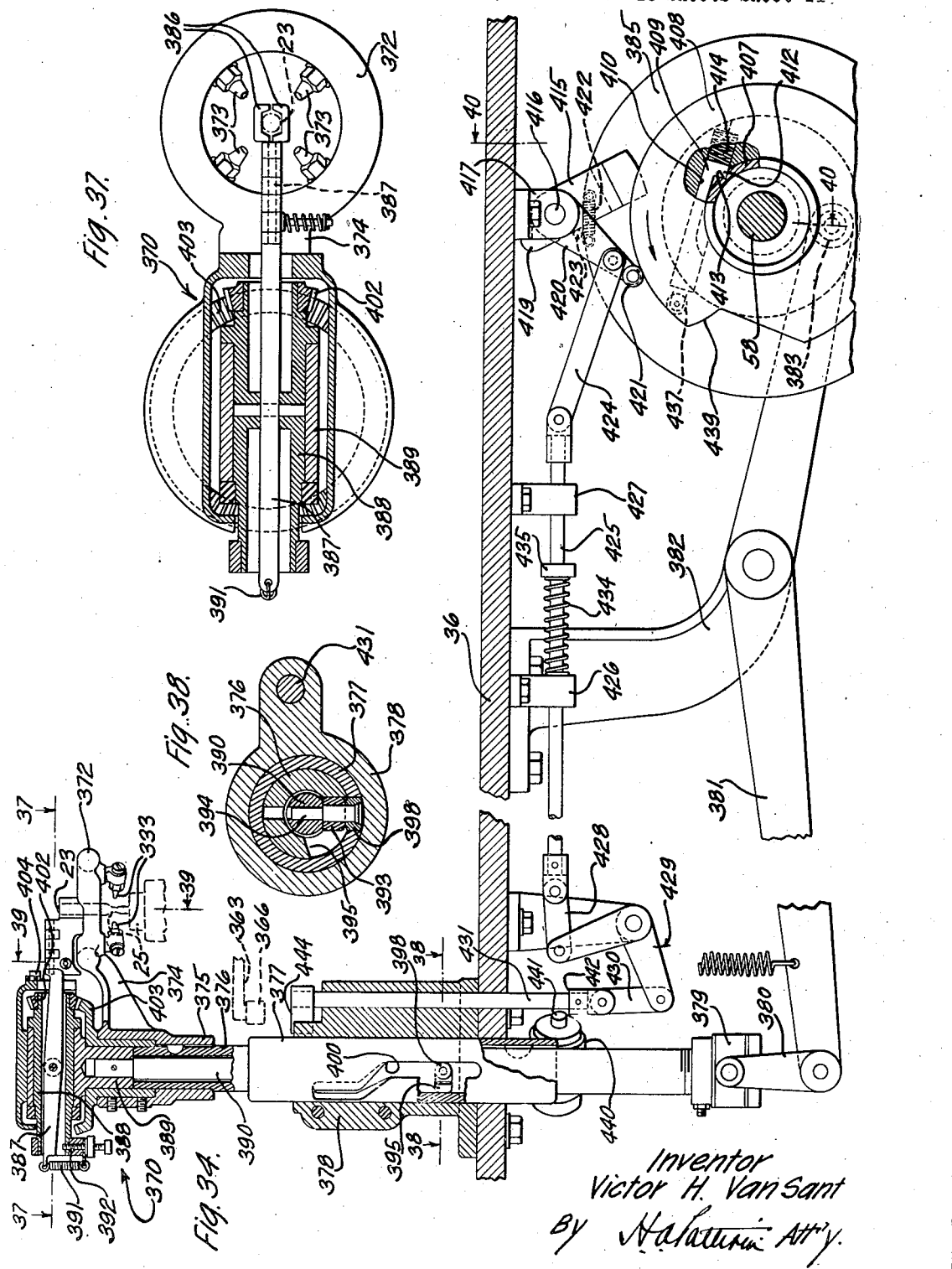

Dec. 10, 1935.  V. H. VAN SANT  2,023,628
METHOD OF AND APPARATUS FOR MANUFACTURING ELECTRIC LAMPS
Filed Oct. 10, 1929   13 Sheets-Sheet 12
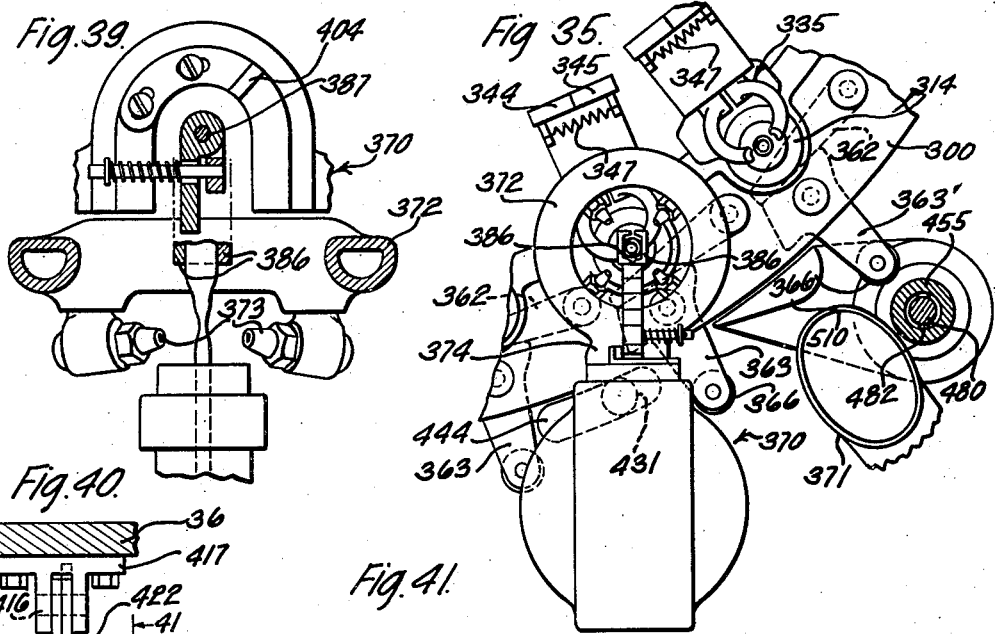
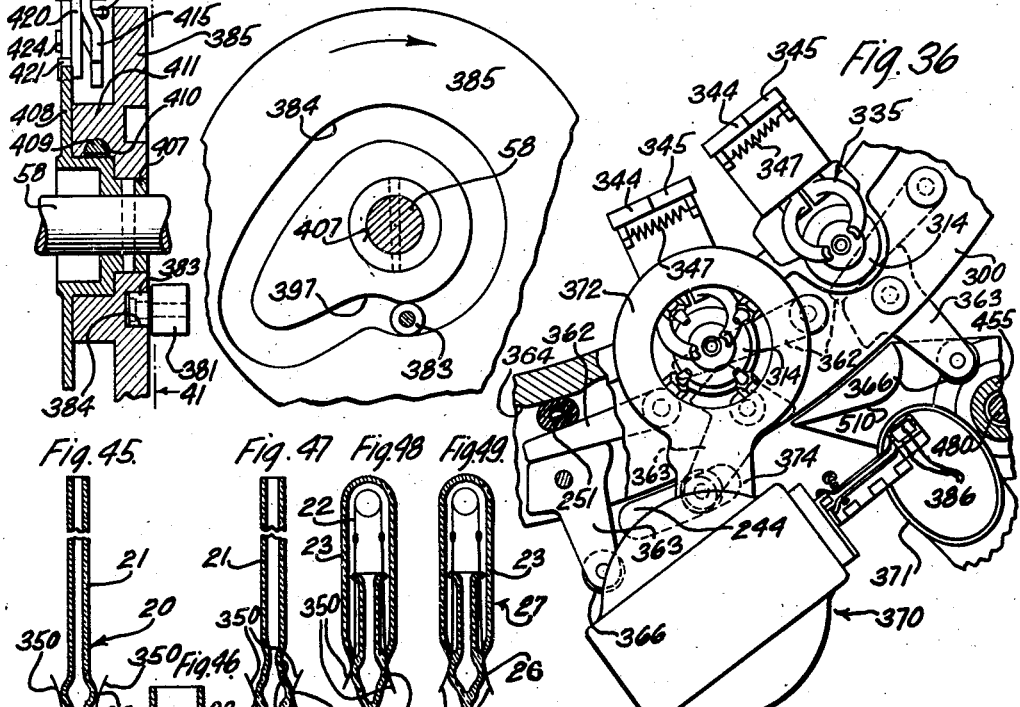
Inventor
Victor H. Van Sant
By H. A. Patterson Att'y.

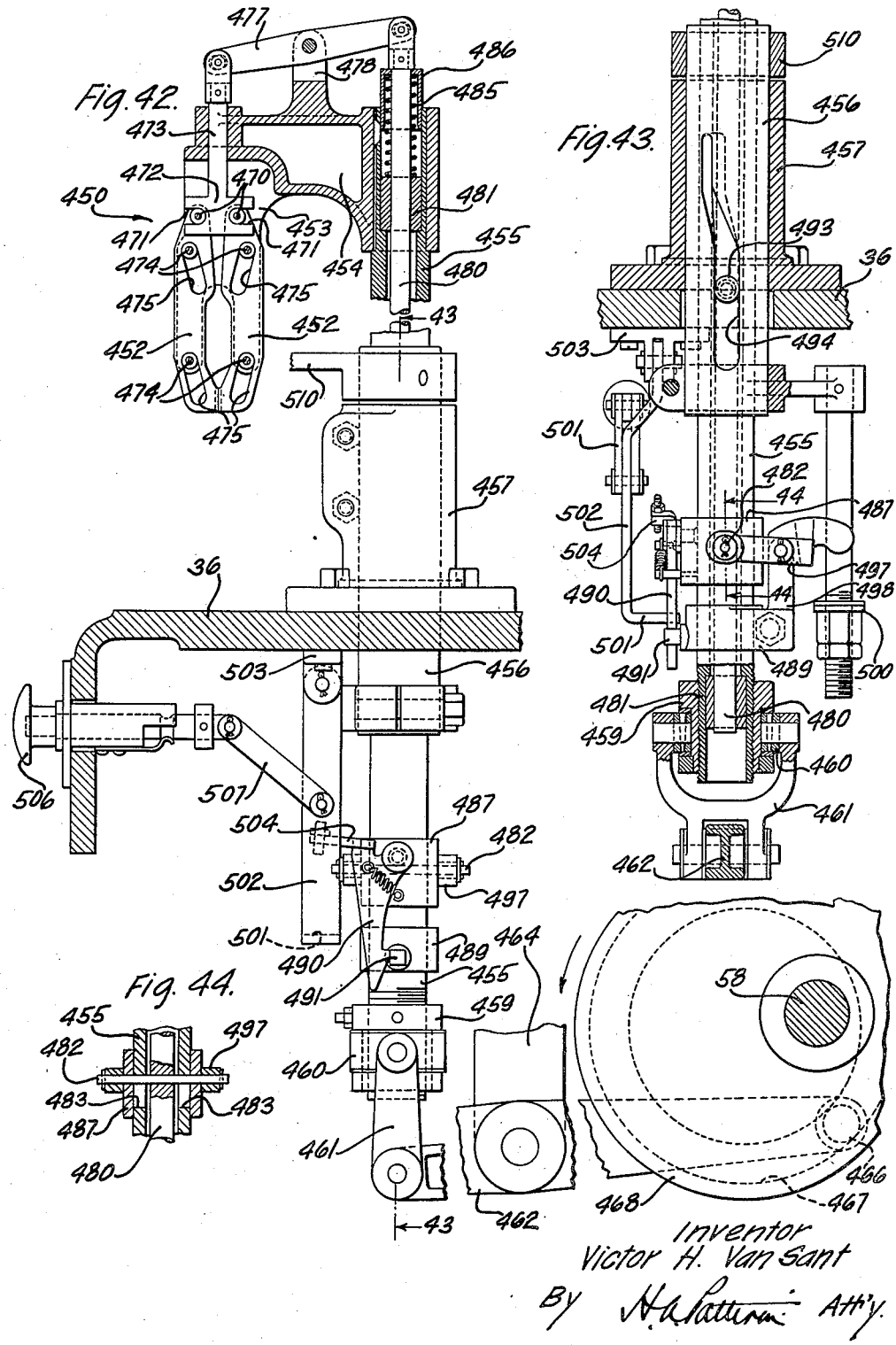

Patented Dec. 10, 1935

2,023,628

UNITED STATES PATENT OFFICE 2,023,628

METHOD OF AND APPARATUS FOR MANUFACTURING ELECTRIC LAMPS

Victor H. Van Sant, Brookfield, Ill., assignor to Western Electric Company, Incorporated, New York, N. Y., a corporation of New York Application October 10, 1929, Serial No. 398,710

32 Claims. (Cl. 176—3)

This invention relates to the manufacture of electric lamps, and more particularly to apparatus for assembling, sealing-in, and exhausting electric lamps.

An object of the present invention is to provide an improved apparatus whereby electric lamps of an improved and uniform quality may be manufactured economically and with a minimum amount of manual labor.

An apparatus embodying the features of the invention comprises a sealing-in section and an exhausting section, each consisting of a rotatable circular carrier, mounted side-by-side, and having a plurality of individual work receiving and supporting units adapted to be advanced synchronously and intermittently to a plurality of successive positions by means of a common drive mechanism. In the sealing-in section of the apparatus, the bulb and the stem assembly are assembled and sealed together in an inverted position and a constriction is formed in the stem at a point adjacent to the seal to facilitate the final tipping off operation. A transfer mechanism is provided for removing the sealed-in lamp from the final position of the sealing-in section of the apparatus and for inserting it, in an upright position, in the exhausting section of the apparatus, wherein the lamp is evacuated. During the exhausting operation the lamps are passed through an electrically heated oven which heats the glass parts to a temperature just below the melting point of glass. This is for the purpose of driving off occluded gases from the internal surface of the glass. After the lamp has been partially evacuated, the filament is heated to incandescence by electrical current connected thereto through the medium of a distributor and suitable contactors on each exhausting unit in order to drive off occluded gases from the filament. An automatic torch is provided for tipping-off the evacuated lamp by fusing the stem at the previously constricted portion thereof. The finished lamp is automatically discharged by mechanism associated with the tipping-off torch, thus completing one cycle of operation of the apparatus. Means is also provided for extracting the excess portion of the stem tube after the tipping-off operation.

These and other features and advantages of the invention will be clearly understood from the following detailed description, reference being had to the accompanying drawings, wherein Fig. 1 is a plan view, partly in section, of an apparatus embodying the features of the invention;

Fig. 4 is an enlarged fragmentary vertical section through the center of the exhausting section of the apparatus, taken on line 4—4 of Fig. 1;

Fig. 5 is a fragmentary plan section on line 5—5 of Fig. 2, showing the drive arrangement;

Fig. 6 is an enlarged fragmentary elevational view of one of the sealing-in heads;

Fig. 7 is a vertical section, partly in elevation, taken on line 7—7 of Fig. 6;

Fig. 8 is a plan view of the structure shown in Figs. 6 and 7;

Fig. 9 is a skeleton plan section on line 9—9 of Fig. 7, showing the leverage mechanism for operating the upper jaws of the sealing-in head;

Figure 1:
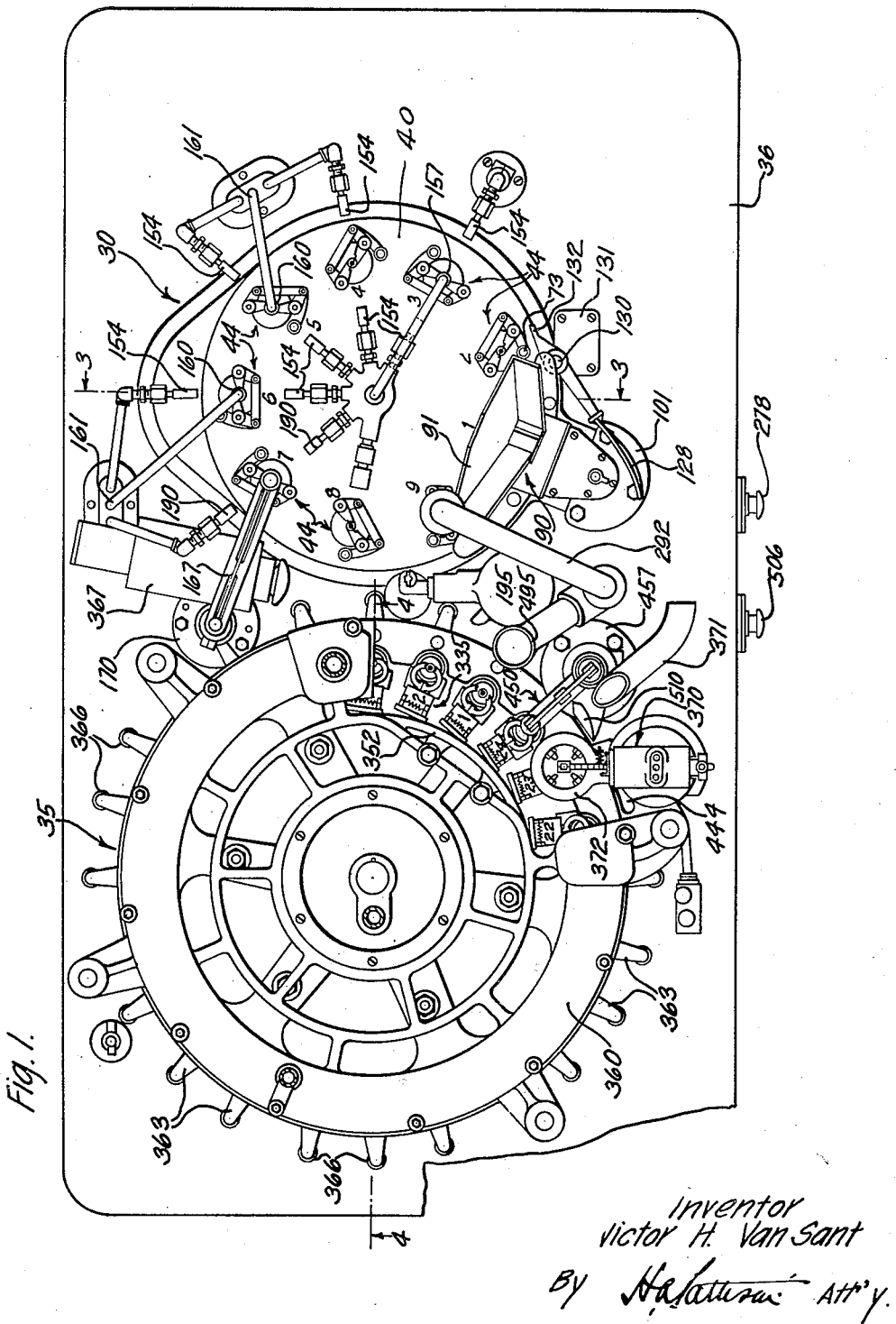

Figs. 10 and 11 are enlarged fragmentary detail sections on lines 10—10 and 11—11, respectively, of Fig. 7;

Fig. 12 is a diagrammatic plan view of the cams for operating the sealing-in heads;

Fig. 13 is a developed side elevational view thereof;

Fig. 14 is an enlarged fragmentary vertical section through the bulb feeding mechanism;

Fig. 15 is a plan section on line 15—15 of Fig. 14;

Fig. 16 is a section on line 16—16 of Fig. 14;

Fig. 17 is an enlarged fragmentary vertical section through the stem centering device;

Fig. 18 is a fragmentary detail section on line 18—18 of Fig. 17;

Fig. 19 is an enlarged fragmentary side elevational view, partly in section, of the transfer mechanism;

Fig. 20 is a plan view of the transfer mechanism with portions of the sealing-in and exhausting units shown diagrammatically;

Fig. 21 is an enlarged vertical section on line 21—21 of Fig. 19;

Fig. 22 is an enlarged fragmentary section on line 22—22 of Fig. 21;

Fig. 23 is a plan section on line 23—23 of Fig. 22;

Fig. 24 is a fragmentary detail section on line 24—24 of Fig. 22;

Fig. 25 is an enlarged fragmentary section on line 25—25 of Fig. 19;

Fig. 26 is a fragmentary rear elevational view, partly in section on line 26—26 of Fig. 19;

Fig. 27 is a fragmentary detail section on line 27—27 of Fig. 19;

Figs. 28, 29, and 30, are fragmentary detailed sections on lines 28—28, 29—29, and 30—30, respectively, of Fig. 26;

Fig. 31 is an enlarged fragmentary vertical section through one of the exhausting units;

Fig. 32 is a detail section on line 32—32 of Fig. 31;

Fig. 33 is a developed fragmentary elevational view of two exhausting units showing the cam for holding the electrical contactors open at the loading and unloading positions;

Fig. 34 is an enlarged fragmentary vertical section through the tipping-off torch;

Fig. 35 is an enlarged fragmentary plan view showing the transfer mechanism in position for tipping-off a lamp;

Fig. 36 is a view similar to Fig. 35 with the transfer mechanism shown in position for discharging a tipped-off lamp;

Fig. 37 is an enlarged plan section on line 37—37 of Fig. 34;

Fig. 38 is an enlarged horizontal section on line 38—38 of Fig. 34;

Fig. 39 is an enlarged fragmentary section on line 39—39 of Fig. 34;

Fig. 40 is a fragmentary vertical section on line 40—40 of Fig. 34;

Fig. 41 is a fragmentary vertical section on line 41—41 of Fig. 40;

Fig. 42 is an enlarged fragmentary vertical section through the stem extracting mechanism;

Fig. 43 is a fragmentary vertical section on line 43—43 of Fig. 42;

Fig. 44 is a fragmentary detail section on line 44—44 of Fig. 43;

Figs. 45 and 46 are detail views of a stem assembly and a companion bulb, respectively, which may be employed in the manufacture of electric lamps by the apparatus of the present invention, and Figs. 47 to 49, inclusive, illustrate the progressive steps in the manufacture of electric lamps by the apparatus of the present invention.

The apparatus of the present invention may be employed to advantage in the manufacture of small incandescent electric lamps of the type employed as signal indicators in telephone systems. In accordance with this embodiment of the invention, a stem assembly 20 (Fig. 45) comprising a glass tube 21 having a filament 22 attached at one end thereof is inserted and sealed in a tubular glass bulb 23 (Fig. 46) having a semi-spherical closed end 24. The tube 21 is formed with an enlarged spherical portion 26 located at a predetermined distance from the filament end thereof for facilitating the sealing-in operation as hereinafter described. As shown in Fig. 47, the seal is formed with the stem assembly in an inverted position. Before exhausting, a constricted portion 25 (Fig. 47) is formed in the stem just below the seal to facilitate the tipping-off of the lamp after it has been exhausted. A lamp 27 produced by the apparatus of the present invention is shown in Fig. 49.

Figure 2:
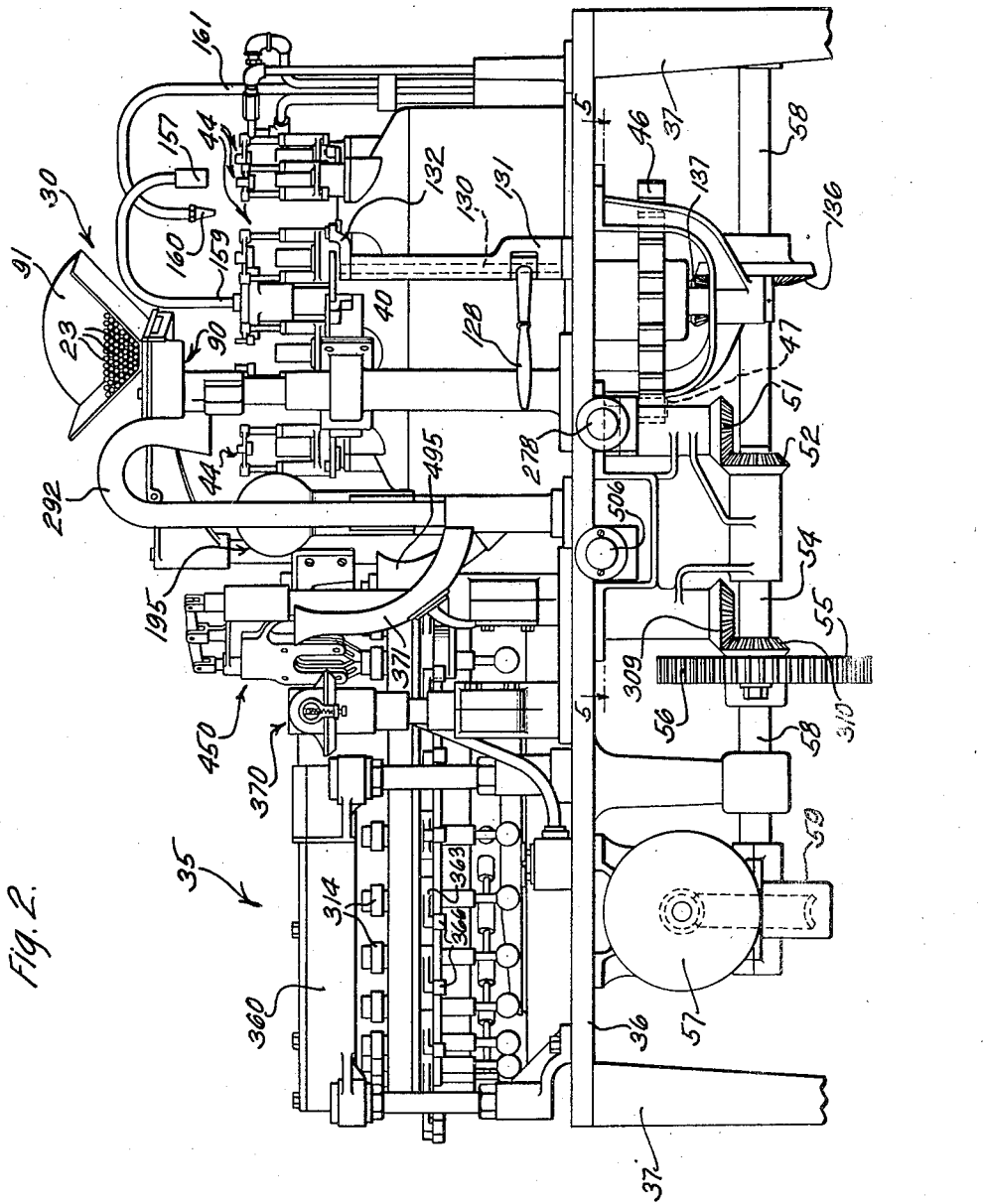
Fig. 2 is a front elevational view, partly in section, of the apparatus shown in Fig. 1.

Referring now to the drawings, and particularly to Figs. 1 and 2 thereof, it will be observed that the improved lamp making apparatus comprises a sealing-in section 30 and an exhausting section 35 mounted side by side in a supporting frame comprising a bed plate 36 having suitable supporting legs or standards 37. These two sections together with the various cooperating mechanisms will be described hereinafter in the order in which each mechanism performs its particular function.

Figure 3:
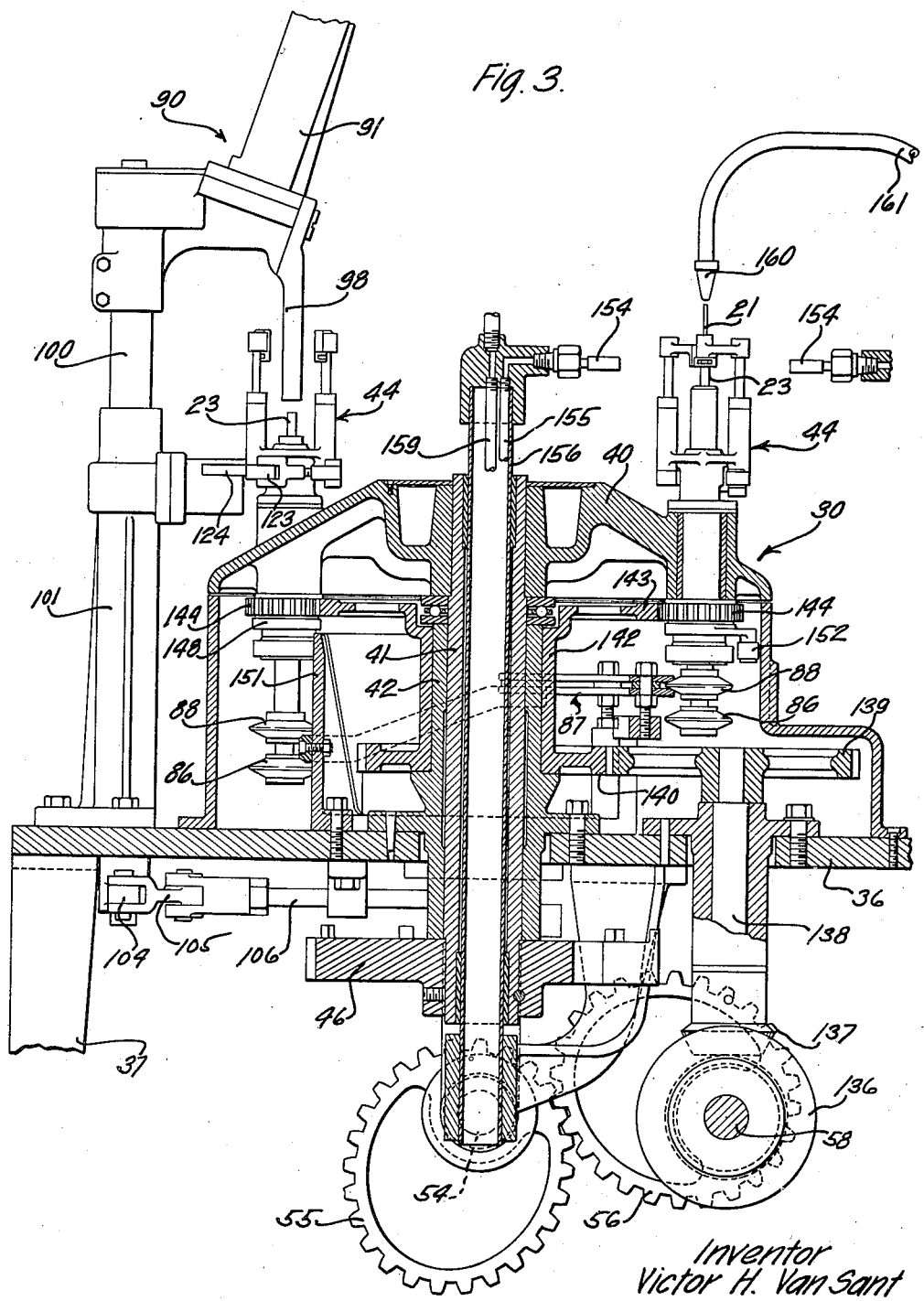
Fig. 3 is an enlarged fragmentary vertical section through the center of the sealing-in section of the apparatus, taken on line 3—3 of Fig. 1.

As shown in Fig. 3, the sealing-in section comprises a circular carrier 40 secured to the upper end of a vertically disposed hollow spindle 41 rotatably mounted in a central bracket 42 attached to the bed plate 36. Rotatably mounted in the carrier 40 are a plurality of equi-distantly spaced sealing-in heads designated, generally, by the numeral 44. In the present embodiment of the invention, nine of these sealing-in heads are provided and they are arranged so as to be successively advanced to nine equi-distantly spaced positions by the intermittent rotation of the carrier 40 in the manner hereinafter described. It will be noted that the nine positions are numbered from 1 to 9, inclusive, in Figs. 1, 12, and 13 of the drawings for convenience in describing the operation of the apparatus.

A Geneva drive mechanism is provided for intermittently rotating the carrier 40 to index the sealing-in heads to the successive positions. Secured to the lower end of the spindle 41 is a Geneva wheel 46 which is driven in the usual manner by a roller 47 (Fig. 5) carried by a driver 48 secured to a vertical shaft 50. The shaft 50 is driven through beveled gears 51 and 52 from a horizontal shaft 54 which in turn is driven through elliptical gears 55 and 56 from a main drive and cam shaft 58 connected to an electric motor 57 through a conventional gear reducing-mechanism 59 (Fig. 2). The function of the elliptical gears 55 and 56 is to alternately accelerate and decelerate the speed of rotation of the shaft 54 whereby the indexing period of the apparatus is shortened and the sealing-in and exhausting periods are correspondingly lengthened.

Inasmuch as the sealing-in heads 44 are all of the same construction, a detailed description of one of them will be sufficient to a complete understanding of the invention. Thus, each sealing-in head comprises a vertical tubular frame member or head 60 (Fig. 7) rotatably mounted in the carrier 40 and having diametrically opposed spaced vertical bearings 61 and 62 formed at the upper end thereof. Rotatably mounted in the bearings 61 and 62 are vertical shafts 64 and 65, respectively, having co-operating jaw members 66 and 67 secured to the upper ends thereof. The jaws 66 and 67 are formed with cooperating semi-spherical recesses 68—68 (Fig. 11) for accommodating the spherical portion 24 of the stem assembly 20, whereby the stem assembly is readily positioned properly between the jaws. Arms 69 and 70 (Figs. 8 and 9) secured to the lower ends of the shafts 64 and 65, respectively, are pivotally interconnected by a link 71 having an arm 72 extending transversely from one end thereof and carrying a roller 73. By depressing the roller 73 to the dotted line position shown in Fig. 9, the link 71 is moved to the left thereby opening the jaws 66 and 67 against the tension of a spring 75 attached at one end to the arm 69 and secured at its opposite end to a pin 76 attached to the bearing 62 (Fig. 8).

A vertical sleeve 78 is slidably mounted in the tubular head 60 and is provided with an elongated key way 79 for accommodating a key 80 secured to the head whereby the sleeve 78 is rotatable with the head (Fig. 7). Slidably mounted in the upper portion of the sleeve 78 is a spring chuck 82 having a tubular stem 83 secured to the lower end thereof. A compression spring 84 interposed between the lower end of the chuck stem 83 and a shouldered lower end of the sleeve 78 serves to yieldably move the chuck upwardly causing the spring jaws of the chuck to be pressed inwardly in a well known manner to yieldably engage a lamp bulb 23 inserted therebetween. The chuck stem 83 is provided with an elongated key way 85 for accommodating the key 80 whereby the chuck is rotatable with the sleeve 78 and head 60. A disk or cam follower 86 is secured to the lower end of the chuck stem 83 and a similar disk 88 is secured to the lower end of the sleeve 78 (Fig. 7). The purpose of the construction just described will become apparent as the detailed description progresses.

While being indexed to position No. 1 the lower chuck 82 of each sealing-in head is automatically opened by means of an annular cam 87 suitably secured to the bed plate 36 and disposed concentric with respect to the carrier 40 (Figs. 3, 12, and 13). The disks 86 and 88 are spread apart by a portion 89 (Fig. 13) of the cam 87 against the action of the spring 84 (Fig. 7), thus permitting the spring jaws of the chuck to open in a well known manner.

While dwelling at position No. 1, a bulb 23 is automatically inserted in the spring chuck 82 of each sealing-in head 44 by means of a bulb feeding mechanism 90. This mechanism comprises a substantially U-shaped hopper or magazine 91 designed to hold a plurality of bulbs 23 arranged therein in horizontal rows as shown in Figs. 14 and 16. The bottom of the hopper is provided with a slot 93 through which the bulbs drop, one at a time, upon a horizontal plate 94 slidably mounted immediately below the hopper (Fig. 16). The plate 94 is provided with a slot 95 arranged to register with the slot 93 when the plate is moved to the right whereby the bulb drops to the upper surface of a horizontal plate 96 attached to the hopper. When the plate 94 is moved to the left (Fig. 16) the slot 95 registers with a U-shaped groove or depression 97 formed in the plate 96, which groove is offset with respect to the slot 93 and communicates with a vertical guide tube 98 attached to the plate 96. From the construction just described it will be obvious that through the reciprocation of the plate 94 the bulbs are discharged one at a time from the magazine 91 and drop in an inverted position through the guide tube 98 into the open chuck 82 of the sealing-in head. The chuck 82 is provided with a plurality of spring fingers 99, 99 (Fig. 10), the upper ends of which project inwardly and serve to temporarily support the bulb within the open chuck.

The magazine 91 is attached to the upper end of a tubular post 100 which is secured at its lower end in a bracket 101 fixed to the bed plate 36 (Fig. 14). Rotatably journaled in the post 100 is a vertical shaft 103 having an arm 104 fixed to the lower end thereof. The arm 104 is pivotally interconnected through a link 105 to one end of a horizontally disposed slidable rod 106, the other end of which is pivotally interconnected through a link 107 to an adjustable arm 108 of a bell crank lever 109 pivotally supported in a bracket 110 secured to the underside of the bed plate 36. Another arm 111 of the bell crank lever 109 carries a roller 113 which rides in a cam slot 114 formed in the face of a cam 115 keyed to the cam shaft 58.

From the arrangement just described, it will be understood that the rotation of the cam 115 imparts an oscillatory motion to the vertical shaft 103. An arm 118 is keyed, at one end, to the upper end of the shaft 103 and is bifurcated at its other end to accommodate a roller 119 carried upon a projecting portion 120 of the plate 94 whereby the oscillatory motion of the shaft 103 produces a reciprocatory motion of the plate 94.

Means is provided for automatically opening the upper jaws 66 and 67 of each sealing-in head upon arriving at position No. 1 to permit the insertion of a bulb in the lower chuck 82 by the bulb feeding mechanism 90. Secured at one end to the vertical shaft 103 of the bulb feeding mechanism is an arm 122 (Figs. 14 and 15) which is bifurcated at its other end to accommodate a roller 123 carried by an arcuate shaped cam 124 slidably mounted in the bracket 101. The cam 124 is formed with elongated slots 125—125 which engage guide pins 126—126 secured to the bracket 101 (Fig. 15). It will be understood that the upper jaws 66 and 67 of the sealing-in head are maintained open at position No. 1 due to the depression of the roller 73 by the cam 124, as shown in dotted outline in Fig. 15.

As the sealing-in head is indexed from position No. 1 to position No. 2, the roller 73 rides past the end of the cam 124 (Fig. 15) permitting the upper jaws 66 and 67 to close under the tension of the spring 75 (Fig. 8). While dwelling at position No. 2, an operator inserts a stem assembly 20 in an inverted position between the upper jaws 66 and 67 of the sealing-in head. A hand lever 128 (Figs. 1 and 2) positioned within convenient reach of the operator is provided for manually opening the jaws 66 and 67 to insert a stem assembly therebetween. The hand lever 128 is secured to a vertical shaft 130 rotatably journalled in a bracket 131 attached to the bed plate 36. An arm 132 attached to the upper end of the shaft 130 is adapted to depress the roller 73 when the hand lever is moved outwardly, thereby opening the upper jaw members in the manner hereinbefore described. The operator properly positions a stem assembly in an inverted position between the open jaw members and upon releasing the hand lever 128, the stem assembly is securely gripped between the jaw members under the tension of the spring 75.

With a bulb and stem assembly supported therein as described above, the sealing-in head is indexed to position No. 3. While advancing to this position the lower chuck assembly is moved upwardly in such manner that the bulb 23 telescopes the stem assembly 20, as shown in Fig. 7. This movement is effected by an inclined portion 133 of a cam slot 134 formed in the cam 87 (Fig. 13) which moves the disk 88 upwardly whereby the lower chuck assembly is elevated to a position wherein the bulb 23 is properly positioned for sealing with the stem assembly 20. The upper end of the bulb 23 engages the bottom side of the upper jaws 66 and 67 and is thereby pressed downwardly into the lower chuck 82 spreading the spring fingers 99 outwardly as will be clearly understood by referring to Figs. 7 and 10. At this time the disk 86 is released by the cam 87 thus allowing the lower chuck to securely grip the bulb under the tension of the spring 84.

Before arriving at position No. 3, rotation of the sealing-in head is automatically started through mechanism which will presently be described. Keyed to the shaft 58 is a bevel gear 136 which meshes with a bevel gear 137 (Figs. 3 and 5) secured to the lower end of a vertical shaft 138. A gear 139 fixed upon the upper end of the shaft 138 meshes with a gear 140 formed integral with a sleeve 142 freely rotatable about the center bracket 42. A gear 143 rotatable with the sleeve 142 meshes with a pinion 144 carried by the sealing-in head 44. From the gearing arrangement just described, it will be obvious that the pinion 144 is continuously driven from the cam shaft 58.

As shown in Fig. 7, the pinion 144 is mounted so as to rotate freely around a bushing 146 keyed to the tubular head 60. Attached to the bottom face of the pinion 146 is a leather friction ring 147 which is adapted to be engaged by a clutch plate 148 threaded upon a collar 149 clamped to the tubular head 60. It will be noted that the clutch plate 148 is provided with coarse internal left hand threads for engaging corresponding external threads forms on the collar 149, whereby a relatively slight rotary movement of the clutch plate 148 in a clockwise direction (Fig. 12) causes the clutch plate to operatively engage the friction ring 147, thus driving the head 60. The clutch plate 148 is normally held in an engaged position by a spring 150 (Fig. 6) having one end attached to the collar 149 and its opposite end fastened to the clutch plate. A roller 152 is carried upon a transverse projection 153 of the clutch plate and is adapted to be engaged by a drum cam 151 (Fig. 12) at the loading and unloading positions 1, 2, and 9, whereby the roller is depressed and the clutch plate is turned in a clockwise direction against the tension of the spring 152, thus causing the clutch plate to be disengaged from the leather faced pinion 144 and positively preventing rotation of the sealing-in head. As the sealing-in head is indexed from position No. 2 to position No. 3, the clutch roller 152 rides off the end of the drum cam 151 (Fig. 12) whereupon the clutch is automatically engaged under the tension of the spring 150 thus starting the rotation of the sealing-in head, which rotation continues through positions 3 to 8, inclusive. As indicated by the arrows in Figs. 8 and 12, the sealing-in head is rotated in a clockwise direction, which direction of rotation obviously tends to normally hold the clutch engaged due to the left hand thread construction of the clutch plate 148, as described above.

While dwelling at positions Nos. 3, 4, 5, and 6, the glass bulb 23 and the companion stem assembly 20 are gradually heated to a sealing-temperature by means of a plurality of gas burners 154, 154 (Fig. 1) arranged in pairs and adapted to direct diametrically opposed sealing fires upon the rotating bulb and stem assembly at the point where the seal is to be made. The burners 154 are connected in any suitable manner to a gas supply source (not shown), the inner burners being connected to the gas supply through a pipe 155 (Fig. 3) which passes through a tube 156 extending through the hollow spindle 41.

At position No. 3, a gas burner 157 (Figs. 1 and 2) directs a gas flame upon the upper end of the stem tube for the purpose of glazing and rounding the edges of the glass to prevent cutting of the rubber tubing when the lamp is transferred to an exhaust position of the exhausting section 35, as hereinafter described in detail. The burner 157 is connected to the gas supply by means of a pipe 158 (Fig. 3) extending through the tube 156. At positions Nos. 5 and 6, jets of air are blown by air nozzles 160—160 (Figs. 1, 2, and 3) through the upper end of the stem tube to prevent the molten glass in the seal from collapsing. The air nozzles 160 are connected by suitable piping 161 to a source of compressed air (not shown).

The seal is completed at position No. 6, after which the sealing-in head is indexed to position No. 7 where a pin 163 (Fig. 17) of a diameter slightly smaller than the inside diameter of the stem tube is automatically inserted through the entire length of the stem for the purpose of straightening and centering the internal end of the stem with respect to the bulb, while the seal is still plastic. The mechanism for operating the centering pin 163 is shown in detail in Figs. 17 and 18. As shown in Fig. 17, the pin 163 is carried by a block 165 slidably journaled in a vertical guideway 166 of a bracket 167 secured to the upper end of a hollow post 168 which is supported at its lower end in a bracket 170 attached to the bed plate 36. The block 165 is slotted as indicated at 171 to accommodate a rounded end 172 of a lever 173 which is pivoted intermediate its ends in the bracket 167. The opposite end 174 of the lever 173 is also rounded and fits loosely in a slot 176 of a guide block 177 slidably mounted in the bracket 167. The block 177 is attached to the upper end of a vertical rod 179 which extends through the tubular post 168 and is adapted to slide freely in the bracket 170. A spring 180 encircling the rod 179 and interposed between the bracket 170 and a collar 181 attached to the rod, serves to normally urge the rod upwardly, which movement is transmitted through the lever 173 to move the centering pin 163 downwardly through the stem tube 21 of the lamp assembly, thus straightening and centering the internal end of the stem assembly with respect to the bulb 23.

The withdrawal of the centering pin 163 at the proper time is accomplished by a cam 183 keyed to the cam shaft 58 (Fig. 18). The cam 183 engages a roller 184 carried at the lower end of a yoke 185 attached to the lower end of the rod 179. The yoke 185 is provided with an elongated vertical slot 186 for loosely accommodating a collar 187 loosely mounted on the shaft 58. The cam 183 is designed to move the rod 179 downwardly against the action of the spring 180, which movement is transmitted through the lever 173 to move the centering pin 163 upwardly, whereby it is withdrawn from the stem tube.

While dwelling at position No. 7, a pair of diametrically opposed gas burners 190—190 (Fig. 1) direct fires upon the stem tube just above the seal to render that portion of the stem plastic. In indexing from position No. 7 to position No. 8, the lower chuck 82 is pulled down slightly by a drop 192 (Fig. 13) in the cam slot 134 which controls the chuck elevation. This causes a constricted section 25 to be drawn in the still plastic portion of the stem just above the seal which facilitates the tipping-off of the lamp after it has been exhausted.

Position No. 8 provides time for the seal and constriction to cool below the plastic temperature of glass. At position No. 9, the lamp assembly is automatically unloaded, inverted, and inserted in an upright position into an exhausting unit of the exhausting section 35 by means of a transfer arm 195. This transfer arm is clearly shown in Figs. 19 to 30, inclusive. Referring particularly to Figs. 19, 21, and 22, it will be observed that the transfer arm comprises a tubular horizontal portion 198, a tubular vertical portion 199, and a semi-spherical removable cover plate 200. The vertical portion 199 of the transfer arm is rigidly clamped to the upper end of a vertical sleeve 202 which is slidable and rotatable in a bracket 203 secured to the bed plate 36. A pinion 204 (Fig. 21) is slidably keyed to the lower end of the sleeve 202 and is adapted to be driven by a horizontal rack 205 slidably journalled in a housing 206 attached to the bracket 203. The rack 205 is pivotally connected to one end of a link 208 (Fig.

19) which is pivoted at its other end to a vertical cam lever 209 at a point intermediate the ends thereof (Fig. 29). The lever 209 is pivoted at its upper end upon a shaft 211 supported in brackets 212 and 213 (Fig. 26) secured to the underside of the bed plate 36. A roller 215 carried upon the lower end of the cam lever 209 rides in a cam groove 216 of a cam 218 (Fig. 29) mounted upon and adapted to be rotated with the cam shaft 58 through a manually controlled clutch mechanism, as hereinafter described.

The cam groove 216 is designed so that during each complete revolution of the cam shaft 58, the transfer arm 195 makes one complete excursion which may be traced as follows: Starting from a normal or intermediate position as shown in Fig. 20, the transfer arm is turned first in a clockwise direction to a position wherein it receives a lamp assembly from unloading position No. 9 of the sealing-in section 30, then in a counter-clockwise direction to a position wherein it inserts the lamp assembly into a loading position of the exhausting section 35, and then in a clockwise direction to its normal or intermediate position.

In indexing from position No. 8 to position No. 9, the lower chuck 82 of the sealing-in head is automatically opened and lowered by the cam 87 (Fig. 13) and rotation of the sealing-in head is automatically stopped by the cam 151 (Fig. 12) in the manner hereinbefore described, thus permitting the transfer mechanism to swing into position to grip the lamp assembly, which at this time is supported solely by the upper jaws 66 and 67 of the sealing-in head. The bulb portion of the lamp assembly is gripped between two jaws 220 and 221 (Fig. 23) formed upon the ends of adjacent parallel bars 222 and 223, respectively, the jaw bars being slidably mounted in a sleeve 225 rotatably journaled in the horizontal portion 198 of the transfer arm. The jaw bars 222 and 223 are provided with co-operating rack teeth 226—226 adapted to engage opposite sides of a pinion 227 carried by the sleeve 225. The jaws 220 and 221 are normally held closed under the tension of a spring 228 which tends to move the jaw 220 inwardly, or to the left (Fig. 23), which movement is transmitted through the pinion 227 to move the jaw 221 outwardly or to the right. A disk 229 is secured to the inwardly projecting end of the jaw bar 222 and is adapted to be engaged by a roller 230 eccentrically carried by an oscillatory plate 231 attached to the upper end of a vertical sleeve 232 rotatably journaled in the outer sleeve 202.

The mechanism for oscillating the plate 231 to operate the jaws 220 and 221 will now be described. Slidably keyed to the lower end of the inner sleeve 232 is a pinion 233 (Fig. 21) adapted to be oscillated by a reciprocable rack 234 slidably mounted in the housing 206. The rack 234 is pivotally connected through a link 235 (Fig. 19) to the lower end of a vertical cam lever 236 (Fig. 28) which is pivoted at its upper end upon the shaft 211. A roller 238 carried by the cam lever 236, intermediate the ends thereof, rides in a cam groove 239 of a cam 240 mounted upon the cam shaft 58 and adapted to be driven therefrom through a manually controlled clutch mechanism, as hereinafter described. The cam groove 239 is designed to produce one complete reciprocation of the rack 234 for each revolution of the cam shaft 58, and it will be understood that the reciprocatory motion of the rack 234 is transmitted through the pinion 233, inner sleeve 232, plate 231, roller 230, and disk 229 to oscillate the roller plate 231 which controls the operation of the jaws 220 and 221 of the transfer mechanism.

As the transfer arm moves toward the unloading position No. 9 of the sealing-in unit, the sleeve 232 is rotated in a clockwise direction (Fig. 23) through the mechanism above described, the roller 230 engaging the disk 229, thereby moving the jaw 220 outwardly against the tension of the spring 228. This movement is transmitted through the pinion 227 to move the jaw 221 inwardly, as will be clearly understood by referring to Fig. 23. Thus, upon arriving at position No. 9, the jaws 220 and 221 are held open by the roller 230 against the tension of the spring 228, thereby permitting the transfer arm to swing into position to receive the lamp assembly.

A dwell portion 241 of the cam groove 216 (Fig. 29) causes the transfer arm to dwell for a moment at the unloading position No. 9 of the sealing-in unit while the roller plate 231 is rotated in a counter-clockwise direction by the cam 240, permitting the jaws 220 and 221 to close upon the lamp assembly, under the tension of the spring 228. A dwell portion 242 of the cam groove 239 (Fig. 28) holds the jaws partially open, allowing a small clearance between the jaws and the lamp assembly until the upper jaws 66 and 67 are opened to release the lamp assembly. During this time, the upper jaws 66 and 67 of the sealing-in head are opened by the engagement of the cam 124 with the roller 73 (Fig. 15), whereupon the lamp assembly drops upon a bottom plate 244 attached to the jaw 220 (Fig. 22). The transfer jaws 220 and 221 are then permitted to close under the tension of the spring 228 to securely grip the lamp assembly, and at the same time, the transfer arm is turned in a counter-clockwise direction (Fig. 20) carrying the lamp assembly to the loading position of the exhausting section of the apparatus. During this movement of the transfer arm, the lamp assembly is inverted or turned through 180° through the following mechanism: Formed at the inner end of the sleeve 225 is an intermittent bevel pinion 245 (Fig. 24) which is adapted to be intermittently driven by an intermittent bevel gear 246 secured to the upper end of a vertical shaft 247 slidably journalled in the inner sleeve 232. The shaft 247 is restrained against rotation by a key 248 (Fig. 21) secured to the lower end of a guide sleeve 249 attached to the housing 206. From the construction just described, it will be obvious that upon the movement of the transfer arm toward the loading position of the exhausting section, the bevel pinion 245 is rotated by the stationary bevel gear 246 in such manner as to turn the jaws 220 and 221 in a clockwise direction (Figs. 22 to 24). The pinion 245 and gear 246 are provided with a sufficient number of teeth to turn the jaws through exactly 180°. It will be understood, also, that during the return movement of the transfer arm the direction of rotation of the pinion 245 is reversed and thus the jaws 220 and 221 are turned in a reverse direction, thereby returning to their normal positions in the same manner as described above.

Upon approaching and after arriving at the loading position of the exhausting unit, the transfer arm is lowered sufficiently to insert the lamp assembly, stem downward, in a rubber tubing 251 (Fig. 31) which is connected to the exhausting system hereinafter described. The mechanism for lowering and elevating the transfer arm will be clearly understood by referring to Figs. 19, 21, 25, and 30. The lower end of the outer sleeve 202 is formed with circular rack teeth 252 for engagement with a pinion 253 (Figs. 19, 21, and 25) rotatably mounted in the housing 206. The pinion 253 is oscillated by a reciprocable rack 254 pivotally connected through a link 255 to the lower end of a vertical cam lever 256 which is pivoted at its upper end upon the shaft 211 (Fig. 30). A roller 258 carried by the cam lever 256 intermediate the ends thereof rides in a came groove 259 of a cam 260 mounted upon the cam shaft 58 and adapted to be driven therefrom through a manually controlled clutch mechanism, as hereinafter described. The cam groove 259 is designed to produce one complete reciprocation of the rack 254 for each revolution of the cam shaft 58, and it will be understood that the reciprocatory motion of the rack 254 is transmitted through the pinion 253 and outer sleeve 202 to lower and elevate the transfer arm at the loading position of the exhausting section in the manner hereinbefore described. By means of a spacer sleeve 262 and suitable thrust collars 263 and 264 (Fig. 21) the shaft 247 and inner sleeve 232 are longitudinally movable with the outer sleeve 202 whereby a fixed longitudinal relationship is maintained therebetween. The transfer arm dwells for a moment at the end of its downward travel to allow the jaws 220 and 221 to be opened by the roller 230 through the movement of the oscillatory plate 231. After the jaws have been opened, the transfer arm is elevated to its original position and is simultaneously swung to the left to receive another lamp assembly from the unloading position of the sealing-in section.

From the above description it will be apparent that the transfer mechanism is operated from the cam shaft 58 in synchronism with the sealing-in and exhausting section of the apparatus by the cams 218, 240 and 260. As shown in Fig. 27, these cams are all keyed to a sleeve 266 loosely mounted on the cam shaft 58 and provided at one end with an external annular flange 267. The flanged end of the sleeve 262 is recessed as indicated at 268 to fit loosely over a clutch collar 269 pinned to the cam shaft 58. The collar 269 is notched as shown at 270 (Fig. 19) to accommodate a shoulder 271 of a clutch pin 272 slidably journalled in the flange portion of the sleeve 266. A spring 274 serves to normally hold the clutch pin engaged with the notched collar 269 whereby the cam carrying sleeve 266 is normally driven with the cam shaft 58.

Manually controlled means is provided for disengaging the clutch pin 272 when it is desired to render the transfer mechanism inoperative. Pivoted upon the shaft 211 is a detent 276 (Figs. 19 and 26) which is connected by a rod 277 to a knob 278 located on the front side of the machine within convenient reach of the operator. The detent 276 is normally held in an inoperative position, as shown in Fig. 19, by a leaf spring 280 adapted to engage a notch 281 formed in the connecting rod 277. When it is desired to render the transfer mechanism inoperative, as for example, when the operator observes an imperfectly sealed lamp in the cooling position No. 8 of the sealing-in section, the knob 278 is pulled outwardly thereby moving the detent 276 to the left (Fig. 19) wherein it engages a roller 283 carried at the outwardly projecting end of the clutch pin 272. Upon engaging the detent 276, the clutch pin is depressed against the action of the spring 274, thereby disengaging the cam carrying sleeve 266 from the continuously rotating cam shaft 58 and thus rendering the transfer mechanism inoperative.

The above described construction is such that the transfer mechanism comes to rest at an intermediate position as shown in Fig. 20. While dwelling at this position, a cam lug 285 (Figs. 19 and 29) carried upon the periphery of the transfer cam 218 engages a plunger 286 of an air valve 287 in a high pressure air line 288 and holds the valve open during the cycle in which the transfer mechanism is inoperative. A second plunger type air valve 289 (Fig. 26) connected in series with the one controlled by the transfer cam 218 is intermittently opened by a cam 290 carried upon the cam shaft 58, the cam 290 being designed so that the two valves are opened at different times during the normal operation of the transfer mechanism. The outlet 291 of the compressed air line 288 is located directly under the lower chuck sleeve of the sealing-in head in the final or unloading position, as shown in dotted outline in Fig. 20. When the transfer mechanism is rendered inoperative, as described above, a blast of high pressure air is directed through the lower chuck sleeve 83 of the sealing-in head, blowing the imperfect lamp assembly into an overhead "goose neck" tube 292 (Figs. 1 and 2) through which it may drop into a suitable receptacle or waste pan (not shown).

The exhausting section 35 of the apparatus will now be described. As shown in Fig. 4, a circular carrier plate 300 is rigidly clamped by bolts 301—301 to a Geneva wheel 302 which, in turn, is rotatable upon a tubular bearing 304 secured to the bed plate 36. The Geneva wheel 302 is intermittently rotated in the usual manner by a roller 306 carried by a driver 307 attached to the upper end of a vertical shaft 308. A bevel gear 309 keyed to the lower end of the shaft 308 meshes with a similar gear 310 secured to the shaft 54. From the construction and arrangement just described, it will be understood that the carrier plate 300 is intermittently rotated in synchronism with the sealing-in section of the apparatus.

The carrier plate 300 is provided near its periphery with a plurality of equi-distantly spaced circular apertures 312, 312 corresponding in number to the number of exhausting units of the apparatus. In the present embodiment of the invention, twenty-four exhausting units are provided and it will be understood that each of the exhausting units is indexed through twenty-four successive positions by the Geneva drive mechanism above described.

Inasmuch as the exhausting units are of similar construction, it is believed that a detailed description of one of these units will be sufficient to a complete understanding of the invention. As shown in Fig. 31, each of the exhausting units comprises a bushing 313 mounted in an aperture 312 of the carrier plate 300 and restrained against rotation therein. A cap 314 is threaded upon the upper end of the bushing 313 and is centrally apertured as indicated at 315 to loosely accommodate the stem portion of a lamp assembly when inserted therethrough by the transfer mechanism. Supported in the upper end of the bushing 313 and extending upwardly into the cap 314 is a rubber tubing 251 which is connected by a nipple 318 to a rubber tubing 319, the latter being connected through a trap 320 (Fig. 4), a rubber tubing 321 and a nipple 322 to a port 323 of a rotatable upper valve plate 325 arranged to be rotated with the carrier 300 through one or more drive pins 326. It will be understood that the upper valve plate 325 is provided with a plurality of equi-distantly spaced ports 323 corresponding in number to the number of exhausting units of the apparatus and that each exhausting unit communicates with a corresponding port 323. The ports 323 terminate in the lower face of the upper valve plate 325. At the first, second, twenty-third, and twenty-fourth positions of the exhausting section of the apparatus, hereinafter referred to as the loading, contact-closing, tipping-off, and stem extracting positions, respectively, the ports 323 are closed off with a vacuum tight seal by an imperforate portion of a stationary lower valve plate 328. In the remaining twenty positions (3 to 22, inclusive) the lamp is evacuated, and at each of these positions the ports 323 of the upper valve plate 325 communicate with similar ports 327 of the stationary lower valve plate 328. The ports 327 communicate through suitable tubing 330 (Fig. 4) with a series of evacuating pumps (not shown) connected in such manner that ten stages of evacuation are provided for each lamp.

The valve plates 325 and 328 are hardened, ground, and lapped to a vacuum tight surface on their engaging faces and are supplied with castor oil through two concentric oil grooves 331—331 to insure a vacuum tight seal at all times. A large oil cup 332 supplies oil to the grooves in the lower valve plate and a small oil cup 333 is connected to the grooves of the upper valve plate to indicate the oil level.

Associated with each exhausting unit is an electrical contact mechanism 335 through which the required voltage is communicated from a voltage control panel (not shown) for heating the lamp filament after the lamp has been partially evacuated. As shown in Figs. 31 and 33, the contact mechanism 335 comprises a pair of contact arms 336 and 337 secured to shafts 338 and 339, respectively, the shafts being rotatably journalled in a bracket 340 attached to the carrier 300 (Fig. 32). A gear 342 keyed to the shaft 338 meshes with a similar gear 343 rotatable with the shaft 339. Arms 344 and 345 are secured at one end to the shafts 338 and 339, respectively, and are interconnected at their opposite ends by a spring 347 in such manner that the contact arms 336 and 337 are normally held closed as shown at the right (Fig. 33). When in this position, the contact arms engage the lead-in wires 350 (Fig. 47) of the lamp assembly, the proper location of the lead-in wires having been predetermined when the stem assembly was inserted between the upper jaws 66 and 67 of the sealing-in head.

At the loading position of the exhausting section of the apparatus, a roller 351 carried upon the free end of the arm 344 is held depressed by a stationary cam 352 designed to hold the contact arms open against the action of the spring 347, as shown at the left (Fig. 33). In indexing from the loading position to the next position, the roller 351 rides off the end of the cam 352 thereby permitting the contact arms 336 and 337 to close upon the lead-in wires 350 of the lamp assembly under the tension of the spring 347.

The contact arm 335 is grounded through the machine framework and the contact arm 337 is insulated from the machine and is connected by an insulated conductor 354 (Fig. 4) to a corresponding spring pressed contact 355 of a centrally located distributor plate 356 supported upon and rotatable with the carrier 300. The contacts 355 are adapted to make contact with fixed contacts 357 of a stationary distributor plate 358 through which an electrical circuit of the desired voltage is completed through the lamp filament to illuminate the lamp in several final stages of the exhausting cycle. This is for the purpose of driving off occluded gases from the lamp filament.

Supported above the exhausting section of the apparatus is an electrically heated oven 360 through which the lamps are passed and thereby externally heated during the process of exhausting for the purpose of driving off occluded gases from the interior surface of the glass. A constant temperature is maintained within the oven which is just below the temperature at which the glass would become plastic and collapse.

Each of the exhausting units is provided with a pinch valve 361 for closing the exhaust passage thereof when the transfer arm fails to insert a lamp therein or when an imperfectly sealed or broken lamp is inserted therein. The pinch valve 361 comprises a pivoted arm 362 (Figs. 35 and 36) and a cooperating pivoted cam lever 363. When the cam lever 363 is swung to the left, as shown in Fig. 36, the rubber tubing 251 of the corresponding exhausting unit is compressed between the arm 362 and a rounded bead 364 formed on the carrier plate 300, thus closing the exhaust passage through the tubing 251. When the transfer mechanism has failed to load a lamp in an exhausting unit, the corresponding pinch valve 361 is closed by a cam 365 secured to the outer sleeve 202 of the transfer mechanism. The cam 365 engages a roller 366 carried at the outer end of the pinch valve lever 363, whereby the latter is swung to the left (Figs. 35 and 36), thus compressing the rubber tubing 251 in the manner described above.

In the first stages of the exhausting cycle, a mercury monometer or "leak-detector" (not shown) is arranged to close an electrical control circuit of a solenoid magnet 367 (Fig. 1) if the pressure in the lamp is such as to indicate the presence of an imperfectly sealed, broken, or leaky lamp. Under such conditions, the solenoid 367 closes the pinch valve 361 of the exhausting unit containing the imperfect lamp.

After the lamp has passed through the twenty exhausting positions (3 to 22, inclusive), it emerges from the oven 360 and is indexed to the tipping-off position (No. 23). In indexing to this position, the contact arms 336 and 337 are opened by the cam 352 in the manner hereinbefore described. While dwelling at this position, a tipping-off mechanism 370 fuses off the stem at the previously constricted portion 25 thereof and discharges the lamp through a tube 371 (Figs. 1 and 2) into a suitable receptacle (not shown).

The tipping-off mechanism 370 is shown in detail in Figs. 34 to 41, inclusive. A circular torch 372 having a plurality of diametrically opposed gas burners 373, 373 (Figs. 34 and 37) is carried upon the end of a transverse arm 374 of a tubular bracket 375 attached to the upper end of a vertical sleeve 376. The sleeve 376 is slidably keyed in a tubular guide 377 rigidly secured in a bracket 378 attached to the bed plate 36. The lower end of the sleeve 376 is pivotally connected through a collar 379 and a yoke 380 to one end of a lever 381 which is pivoted intermediate its ends in a bracket 382 attached to the underside of the bed plate 36. A roller 383 carried upon the opposite end of the lever 381 rides in a cam groove 384 of a cam 385 mounted upon the cam shaft 58 and arranged to be rotated therewith through a clutch mechanism hereinafter described. The cam groove 384 is designed so that the tipping off torch 372 is lowered to a position for tipping-off a lamp and then elevated to a position for discharging the tipped-off lamp, completing one cycle of operation for each revolution of the cam shaft 58.

During the downward movement of the torch 372, the lamp is gripped by a pair of spring pressed jaws 386—386 pivotally supported at the right hand end of a beam 387 (Figs. 34 to 37, inclusive) which is pivoted intermediate its ends in a sleeve 388. The sleeve 388 is rotatably supported in a T-shaped casting 389 (Fig. 34) attached to a reduced upper end of a vertical shaft 390 loosely journalled in the torch supporting sleeve 376. The left hand end of the beam 387 is normally held downwardly by a spring 391 against an adjustable stop 392. A roller 393 mounted upon a stud 394 carried by the shaft 390 engages a transverse slot 395 formed in the sleeve 376, whereby the sleeve 376 and shaft 390 are maintained in fixed longitudinal relationship at all times.

The torch 372 is momentarily lowered to a position slightly below the sealing-off position by a low point 397 of the cam groove 384 (Fig. 41). At this time the lamp is securely gripped by the spring pressed jaws 386 whereupon the torch is elevated to the sealing-off position as shown in Fig. 34. As the torch is elevated to this position, the jaws 386 tend to remain stationary due to their spring pressed gripping engagement with the bulb portion of the lamp, thus causing the beam 387 to turn slightly in a clockwise direction (Fig. 34) against the action of the spring 391. The torch dwells at this position for a sufficient length of time to complete the tipping-off operation. The fires from the torch burners 373 are directed upon the previously constricted portion 25 of the stem, and upon the glass becoming plastic the jaws 386 are elevated slightly by a counterclockwise movement of the beam 387 under the action of the spring 391. This causes the constricted portion of the stem to be extended so as to facilitate the sealing-off and tipping-off operations.

Upon the completion of the tipping-off operation, the torch 372 and the jaws 386 carrying the tipped-off lamp are elevated to a position for discharging the lamp and to permit the next lamp to be indexed to the sealing-off position. A roller 398 carried by the stud 394 rides in a vertical cam slot 400 formed in the stationary guide sleeve 377 (Fig. 34). The cam slot 400 serves to accurately center the jaws 386 with respect to the lamp during the downward movement of the shaft 390 and also serves to oscillate the shaft 390 during its upward movement to turn the jaw supporting beam 387 through approximately 45° to the position in Fig. 36. In turning to this position, the jaws 386 are rotated through approximately 120° through the engagement of a bevel pinion 402 with a stationary bevel gear 403 secured to the bracket 375 (Figs. 34 and 37), the pinion 402 being secured to the sleeve 388. At the end of their rotary movement, the jaws 386 are opened to release the lamp by the engagement of one of the jaws with a stop pin 404 (Figs. 34 and 39), the lamp dropping through the delivery chute or guide tube 371 (Figs. 1, 2, and 36) into a suitable receptacle (not shown). This completes one cycle of operation of the tipping-off torch.

Means is provided for automatically rendering the tipping-off torch inoperative when an empty exhausting unit or one containing an imperfect lamp is indexed to the tipping-off position. As shown in Fig. 40, the cam 385 fits loosely upon a hub portion 407 of a disk 408, the disk 408 being pinned to the cam shaft 58 so as to be rotatable therewith. A clutch pin 409 is slidably mounted in a slot 410 formed in a hub portion 411 of the cam 385 and is provided with a shoulder 412 adapted to engage a notch 413 formed in the hub portion 407 of the disk 408 (Fig. 34). A spring 414 serves to normally hold the clutch pin 409 in locking engagement with the disk 408 whereby the cam 385 is normally rotatable with the cam shaft 58. A detent 415 is pivoted upon a pin 416 mounted in a bracket 417 secured to the underside of the bed plate 36. The detent 415 is formed with a lug or projection 419 for engaging the bracket 417 to limit its movement in a clockwise direction (Fig. 34). An arm 420 is pivoted at one end upon the pin 416 and carries a roller 421 at its opposite end which is adapted to engage the periphery of the disk 408. A tension spring 422 interconnects the arm 420 with the detent 415 whereby the latter is normally pressed against a pin 423 secured to the arm 420. The arm 420 is pivotally connected by a link 424 to a horizontal rod 425 slidably journalled in guide blocks 426—427 secured to the underside of the bed plate 36. The rod 425 is connected to a link 428 which, in turn, is connected to a bell crank lever 429, the latter being connected by a link 430 to a vertical rod 431 slidably journalled in the bracket 378 and projecting through the upper end thereof. The arm 420 is normally pressed against the periphery of the disk 408 under the tension of a compression spring 434 which encircles the horizontal connecting rod 425 and bears at one end against the guide block 426 and at its opposite end against a collar 435 secured to the rod 425.

It will be understood that upon the rotation of the cam 385 in the direction indicated by the arrow (Fig. 34) the detent 415, when positioned as shown, will engage a roller 437 carried upon the externally projecting end of the clutch pin 409 and thereby move the clutch pin 409 out of locking engagement with the disk 408. The rotation of the torch cam 385 would thus be discontinued, thereby rendering the tipping-off torch inoperative. However, the construction and arrangement of the parts is such that under normal operating conditions the detent 415 is swung to the right (Fig. 34) out of the path of the clutch pin 409 so as not to interrupt the operation of the tipping-off torch. The disk 408 is notched, as indicated at 439, to permit the arm 420 to swing to the right under the action of the spring 434 and thereby cause a corresponding movement of the detent 415. The notch 439 is positioned and designed so that the detent 415 is swung out of the path of the clutch pin roller 437 at the proper time, once during each revolution of the cam 385, and thus the operation of the tipping-off torch is uninterrupted except under the following abnormal conditions.

The movement of the arm 420 to the right as described above is transmitted through the interconnecting rod 425 and bell crank lever 429 to produce a corresponding upward movement of the vertical rod 431. A vacuum measuring or indicating device (not shown) is arranged to close an electrical control circuit of a solenoid magnet 440 (Fig. 34) when a lamp with insufficient vacuum is about to be indexed to the tipping-off position. This solenoid circuit is also closed through an electrical relay system or other suitable means (not shown) when a lamp having a broken or defective filament is about to be indexed to the tipping-off position. Upon the energization of the solenoid 440, its plunger 441 is projected outwardly over a shoulder 442 of the vertical rod 431, thereby positively preventing the upward movement of the rod 431. Thus, the arm 420 is restrained against the movement to the right and the detent 415 is held by the spring 422 in the position shown in Fig. 34, wherein it is adapted to disengage the clutch pin 409 and thereby discontinue the rotation of the torch operating cam 385, thus rendering the tipping-off torch inoperative.

When an exhausting unit with a closed pinch valve 361 is indexed to the tipping-off position, the vertical rod 431 is restrained against upward movement by the engagement of a cross piece or shelf 444 attached to the upper end of the rod 431 with the closed pinch valve lever 363 as shown in Fig. 36. Thus, the tipping-off torch is rendered inoperative, in the same manner as described above, when an unloaded exhausting unit or one containing a defective lamp is indexed to the tipping-off position. The construction is such that the tipping-off torch, when rendered inoperative, comes to rest at the end of its upward travel so as not to obstruct the passage of the next lamp to the tipping-off position.

At the position immediately following the tipping-off position, the defective lamps and the remaining or excess portions of the lamp stems are removed from the exhausting units by an automatic extracting mechanism 450. This mechanism, as shown in Figs. 42 and 43, comprises a pair of cooperating parallel jaw members 452—452 slidably mounted between spaced portions 453—453 depending from the outer end of a bracket 454 which extends transversely from and is keyed to the upper end of a vertical hollow shaft or sleeve 455. The sleeve 455 is slidably journalled in a stationary tubular guide 456 mounted in a bracket 457 attached to the bed plate 36. An adjustable nut 459 threaded upon the lower end of the sleeve 455 is provided with a loose collar 460 which is pivotally interconnected by a yoke 461 to one end of a lever 462 pivoted intermediate its ends upon a bracket 464 attached to the underside of the bed plate 36. A roller 466 carried upon the opposite end of the lever 462 is adapted to ride in an eccentric groove 467 of a cam 468 secured to the cam shaft 58. The cam groove 467 is designed to cause a reciprocatory motion of the sleeve 455 whereby the jaw members 452 are moved downwardly to grip the stem or defective lamp and then upwardly to discharge the same, completing one excursion for each revolution of the cam shaft 58.

The jaw members 452 are pivotally suspended upon pins 470—470 loosely mounted in oppositely disposed transverse slots 471—471 of a cross piece 472 formed at the lower end of a vertical shaft 473 slidably journalled in the bracket 454. Pins 474—474 interconnecting the spaced depending portions 453 of the bracket 454 engage elongated slots 475—475 formed in the jaw members 452. The slots 475 are designed to produce a parallel movement of the jaws 452 toward each other when the jaws are moved downwardly with respect to the supporting bracket 454, and to produce a corresponding outward movement of the jaws when they are moved upwardly with respect to the supporting bracket. A beam 477 is pivoted intermediate its ends upon an upwardly projecting arm 478 of the bracket 454 and is pivotally connected at one end to the upper end of the jaw supporting shaft 473. The opposite end of the beam 477 is pivotally connected to the upper end of a vertical shaft 480 slidably journalled in bushings 481—481 secured within the sleeve 455. A pin 482 carried by the shaft 480 and projecting from opposite sides thereof engages vertical slots 483—483 (Fig. 44) formed in the sleeve 455, thereby permitting a limited relative movement of the shaft 480 with respect to the sleeve 455. A compression spring 485 interposed between the upper guide bushing 481 and a cap 486 attached to the upper end of the shaft 480 (Fig. 42) serves to normally urge the shaft upwardly with respect to the sleeve 455.

From the construction described above, it will be understood that the shaft 480 is moved upwardly with the sleeve 455. As the sleeve approaches the end of its upward movement, a stop collar 487 carried by the shaft 480 engages the bottom of the stationary guide 456, thus discontinuing the upward movement of the shaft 480. The sleeve 455 continues its upward movement against the action of the spring 485 until a stop collar 489 attached thereto engages the collar 487, whereupon a spring pressed latch 490 carried by the collar 487 engages a pin 491 attached to the collar 489, thereby locking the shaft 480 against relative movement with respect to the sleeve 455. By referring to Fig. 42, it will be apparent that a slight upward movement of the sleeve 455 with respect to the shaft 480 will result in a sufficient upward movement of the jaws 452 with respect to the bracket 454 for opening the jaws to discharge an extracted stem or defective lamp previously gripped therebetween. A roller 493 carried by the sleeve 455 rides in a vertical cam slot 494 formed in the guide tube 456 (Fig. 43). Upon the downward movement of the sleeve 455, the cam slot 494 serves to accurately center the jaws 452 with respect to the remaining stem or defective lamp to be extracted. Upon the upward movement of the sleeve 455, it is turned by the cam slot 494 through approximately 60°, whereby the jaws 452 are carried to a position wherein the extracted stem or defective lamp is discharged into a delivery tube 495 (Figs. 1 and 2).

A member 497 is pivoted intermediate its ends upon an arm 498 extending upwardly from the collar 489 (Fig. 43). One end of this member is bifurcated to straddle the collar 487 and is pivoted upon the projecting ends of the pin 482, (Fig. 42), while the opposite end thereof is adapted to engage an adjustable stop 500 (Fig. 43) as the sleeve 455 approaches the end of its downward movement, whereby the downward movement of the shaft 480 is accelerated, thereby spreading the open jaws 452 farther apart. Upon the jaws arriving in position to grip the stem or lamp to be extracted, the latch 490 is automatically disengaged by a transverse portion 501 of an L-shaped member 502 suspended from a bracket 503 attached to the underside of the bed plate 36. An arm 504 attached to the latch 490 is adapted to engage the transverse portion 501 of the member 502 to cause the disengagement of the latch.

Upon the disengagement of the latch 490, the spring 485 tends to move the shaft 480 upwardly with respect to the sleeve 455, thus causing the jaws 452 to move inwardly to grip the defective lamp or stem to be extracted. However, the action of the spring 485 is retarded by the pivoted member 497 in such manner that the jaws 452 are closed gradually so as not to break the lamp or tubular stem being extracted.

A plunger 506 located in the front of the machine within convenient reach of the operator is connected by a link 507 to the member 502. By pulling out the plunger 506, the member 502 is moved to the left (Fig. 42) out of the path of the latch arm 504. In this manner, the jaws 452 may be maintained open at all times by the latch 490 and thus the stem extracting mechanism may be rendered inoperative at the will of the operator.

The stem extracting operation described above completes one cycle of operation of the apparatus. A cam 510 attached to the tubular guide 456 of the stem extracting mechanism (Figs. 1, 35, 36, and 42) serves to open all of the closing pinch valves 361 as the corresponding exhausting units are indexed to the stem extracting position, thus preparing such units for the next cycle of operation of the apparatus.

It is believed that the operation of the apparatus will be clearly understood from the above detailed description of the various cooperating mechanism. Briefly summarized, the operation is as follows: The sealing-in and exhausting units are advanced synchronously and intermittently to successive positions by means of the Geneva drive mechanisms in the manner hereinbefore described. At the first position of the sealing-in section of the apparatus, a lamp bulb 23 drops from the bottom of the magazine 91 into the lower chuck 82 of the sealing-in unit. At this position the lower chuck is at its lowest point, as will be clearly understood by referring to Figs. 3 and 13. At position No. 2, with the lower chuck still at its lowest point, the operator inserts an inverted stem assembly 20 between the upper jaws 66 and 67 of the sealing-in unit. In indexing from position No. 2 to position No. 3, the lower chuck 82 is closed automatically and is simultaneously elevated by the cam 87 (Fig. 13), causing the inverted bulb 23 to telescope the inverted stem assembly 20, as shown in Fig. 11. Before arriving at position No. 3, rotation of the sealing-in unit is automatically started in the manner hereinbefore described. Positions 3 to 6, inclusive, are used for making the seal between the bulb and the stem assembly. At position No. 7, the pin 163 is inserted through the stem tube to straighten and center the internal portion of the stem with respect to the bulb. Also, at this position the external portion of the stem adjacent to the seal is heated to a plastic temperature. In indexing from position No. 7 to position No. 8, the lower chuck drops slightly, thus forming a constriction in the stem adjacent to the seal for facilitating the final tipping-off operation. Position No. 9 is the unloading position of the sealing-in section of the apparatus. In indexing to this position, rotation of the sealing-in unit is automatically stopped; and the lower chuck 82 is opened and then lowered to permit the transfer arm 195 to swing into position to grip the lamp assembly, which is simultaneously released by the upper jaws 66 and 67 of the sealing-in unit. The lamp assembly is inverted by the transfer mechanism and inserted in an upright position in the rubber tubing 251 of the exhausting unit of the loading position of the exhausting section of the apparatus.

As each exhausting unit is indexed from the loading position to the next position, the contact arms 336 and 337 move toward each other to engage the lead-in wires 350 of the lamp. The next twenty positions (3 to 22, inclusive) are used for exhausting the lamp. During the exhausting cycle, the lamp is heated externally to a temperature just below the plastic temperature of glass in order to drive off condensed gases from the internal surface of the lamp. In the final positions of the exhausting cycle, the filament of the lamp is heated by passing an electrical current therethrough. This is for the purpose of driving off condensed gases from the surface of the lamp filament.

At position No. 23, the torch 372 seals the evacuated lamp by fusing the previously constricted portion of the stem tube, after which the lamp is tipped-off by the torch and discharged into the delivery chute 405. At position No. 24, the stem extractor 450 removes the excess portion of the stem from the rubber tubing 251 of the exhausting unit, thus completing one cycle of operation of the apparatus.

Through the operation of the various mechanisms hereinbefore described for controlling the operation of the transfer mechanism and tipping-off torch, defective lamps are automatically rejected by the apparatus. Thus, it will be understood that by employing the apparatus of the present invention, the sealing-in, exhausting and the numerous intermediate operations incident to the maufacture of electric lamps may be performed simultaneously under the care of a single operator. Furthermore, by the apparatus of the present invention, lamps of an improved and uniform quality may be produced economically, expeditiously, and with a minimum amount of skill and manual labor.

What is claimed is:

1. In an apparatus for manufacturing electric lamps, a sealing-in unit having means for supporting a lamp stem and means for supporting a bulb during the sealing-in operation, an exhausting unit having means for supporting a sealed-in lamp assembly during the exhausting operation, means for transferring a lamp assembly from the sealing-in unit to the exhausting unit, manually controlled means for rendering the transfer mechanism inoperative, and means carried by the transfer mechanism for interrupting the exhausting operation when the transfer mechanism is inoperative.

2. In an apparatus for manufacturing electric lamps, a rotatable carrier, a plurality of sealing units carried thereby, means for intermittently rotating the carrier to advance the sealing-in units through successive loading, sealing-in, and unloading positions, means for inserting a lamp bulb in each sealing-in unit while it dwells at the loading position, means for sealing-in a lamp stem within the bulb, a second rotatable carrier, a plurality of exhausting units carried by the second rotatable carrier, means for intermittently advancing the second carrier in synchronism with the first carrier to advance the exhausting units through successive positions, and means intermediate the first and second carriers for removing a lamp assembly from a sealing-in unit, inverting it and inserting it in an exhausting unit.

3. In an apparatus for manufacturing electric lamps, means for sealing a lamp stem within a bulb, means for evacuating the lamp thus formed, means for tipping-off the evacuated lamp by fusing-off the external portion of the stem, means for removing the fused-off portion of the stem, a chute, said removing means comprising gripping jaws, and means to move said jaws to grip said portion, move it to said chute and discharge it therein.

4. In an apparatus for manufacturing electric lamps, a sealing-in unit having a chuck arranged to receive a bulb when in open position and grip the bulb when in closed position, and auxiliary means carried by said chuck for supporting the bulb when the chuck is in open position.

5. In an apparatus for manufacturing electric lamps, a sealing-in unit having a chuck arranged to receive a bulb when in open position and to grip the bulb when in closed position, and a plurality of radially extending members for supporting the bulb in said chuck when said chuck is in open position.

6. In an apparatus for manufacturing electric lamps, a sealing-in unit, means for supporting a bulb, jaw members for gripping a lamp stem, means for operatively connecting said jaw members together whereby they may be actuated simultaneously for accurately centering the lamp stem within the bulb, means for rotating said bulb supporting means and said jaw members simultaneously, and means for actuating said jaw members during rotation thereof.

7. In an apparatus for manufacturing electric lamps, a sealing-in unit having a chuck for supporting a lamp bulb comprising a sleeve, resilient gripping members disposed in said sleeve for receiving the lamp bulb therebetween when in open position, means for moving said resilient members relative to said sleeve for causing said resilient members to grip the lamp bulb, and means for rotating said resilient members and said sleeve simultaneously for imparting a rotary movement to said lamp bulb.

8. In an apparatus for manufacturing electric lamps, a sealing-in unit having a chuck comprising a sleeve, resilient gripping members disposed in said sleeve for receiving a lamp bulb when in open position, means carried by said resilient members for supporting the lamp bulb when said resilient members are in open position, and means for moving said resilient members relative to said sleeve for moving said resilient members into gripping relation with the lamp bulb.

9. In an apparatus for manufacturing electric lamps, a sealing-in unit having a chuck for supporting a lamp bulb, said chuck comprising a sleeve having a tapered open end, resilient gripping members disposed in said sleeve in engagement with said tapered open end for receiving the lamp bulb, radially extending resilient fingers for supporting the lamp bulb when said resilient gripping members are in open position, and means for moving said resilient gripping members relative to said sleeve for moving said gripping members into gripping relation with the lamp bulb, the gripping movement of said resilient gripping members being effected by the tapered open end of said sleeve.

10. In an apparatus for manufacturing electric lamps, a sealing-in unit having means for supporting a lamp bulb and means for supporting the stem assembly, means for sealing the stem within the bulb to form a lamp assembly, a transfer arm having jaw members for gripping the sealed lamp assembly, means for actuating said transfer arm for removing the lamp assembly from said sealing-in unit, means for inverting the lamp assembly, and means for evacuating said lamp assembly in the inverted position.

11. In an apparatus for manufacturing electric lamps, a sealing-in unit having means for sealing a stem assembly in a lamp bulb to form a lamp assembly, an exhausting unit, means for receiving the lamp assembly from said sealing-in unit, inverting the lamp assembly and transferring the lamp assembly to said exhausting unit comprising jaw members arranged to be moved from said sealing-in unit to said exhausting unit, and means for opening said jaw members to receive the lamp assembly.

12. In an apparatus for manufacturing electric lamps, a sealing-in unit having means for sealing a stem assembly in a lamp bulb for forming a lamp assembly, an exhausting unit, a transfer arm for transferring the lamp assembly from said sealing-in unit to said exhausting unit comprising jaw members, means for actuating said transfer arm for swinging said jaw members from said sealing-in unit to said exhausting unit, means for opening said jaw members when being moved toward said sealing-in unit for receiving the lamp assembly, means for closing said jaw members, and means for moving said jaw members for inverting the lamp assembly.

13. In an apparatus for manufacturing electric lamps, a sealing-in unit having means for sealing a stem assembly in a lamp bulb to form a lamp assembly, an exhausting unit, a transfer arm for transferring the lamp assembly from said sealing-in unit to said exhausting unit comprising jaw members, means for actuating said transfer arm for swinging said jaw members from said sealing-in unit to said exhausting unit, means for opening said jaw members when being moved toward said sealing-in unit for receiving the lamp assembly, means for closing said jaw members upon the lamp assembly, means for moving said jaw members for inverting the lamp assembly, and means for moving said jaw members vertically for disposing said lamp assembly in said exhausting unit.

14. In an apparatus for manufacturing electric lamps, a sealing-in unit having means for sealing a stem assembly in a lamp bulb to form a lamp assembly, an exhausting unit having a chuck for receiving the lamp assembly, a transfer arm jaw members carried by said transfer arm, means for imparting movement to said transfer arm for moving said jaw members toward said sealing-in unit, means for opening said jaw members during the movement thereof toward said sealing-in unit for receiving said lamp assembly, means for closing said jaw members for gripping said lamp assembly, means for moving said jaw members toward said exhausting unit, means for imparting a rotary movement to said jaw members for inverting said lamp assembly, and means for moving said jaw members for inserting the lamp assembly in said chuck.

15. In an apparatus for manufacturing electric lamps, a sealing-in unit having means for sealing a stem assembly in a lamp bulb to form a lamp assembly, an exhausting unit, a transfer arm, jaw members for gripping the lamp assembly in said sealing-in unit, means for imparting movement to said jaw members for removing the lamp assembly from said sealing-in unit, means for simultaneously inverting the lamp assembly and moving the lamp assembly toward said exhausting unit, and means for moving said jaw members for disposing the lamp assembly in said exhausting unit.

16. In an apparatus for manufacturing electric lamps, a sealing-in unit having means for sealing a stem assembly in a lamp bulb for forming a lamp assembly, an exhausting unit, jaw members for receiving the lamp assembly in said sealing-in unit, means for imparting movement to said jaw members for removing the lamp assembly from said sealing-in unit, means for simultaneously inverting the lamp assembly and moving the lamp assembly toward said exhausting unit, means for moving said jaw members for disposing the lamp assembly in said exhausting unit, and manually controlled means for rendering said jaw members ineffective.

17. In an apparatus for manufacturing electric lamps, a sealing-in unit having means for sealing a stem assembly in a lamp bulb to form a lamp assembly, an exhausting unit, jaw members for receiving the lamp assembly in said sealing-in unit, means for imparting movement to said jaw members for removing the lamp assembly from said sealing-in unit, means for simultaneously inverting the lamp assembly and moving the lamp assembly toward said exhausting unit, means for moving said jaw members for disposing the lamp assembly in said exhausting unit, means for rendering said jaw members ineffective, and means cooperating with said last named means for removing the lamp assembly from said sealing-in unit.

18. In an apparatus for manufacturing electric lamps, means for sealing a lamp stem having lead wires within a bulb to form a lamp assembly, a chuck for receiving the lamp assembly, means associated with said chuck for evacuating the lamp assembly, contacting arms for forming electrical contacts with the lead wires of the lamp assembly, means associated with said contact arms for electrically testing the lamp assembly, and means separate from the lamp assembly and connected to said contact arms for actuating said contact arms simultaneously for holding the lamp assembly in predetermined position relative to said chuck.

19. In an apparatus for manufacturing electric lamps, means for sealing a lamp stem within a bulb for forming a lamp assembly, means including a chuck for evacuating the lamp assembly, a tipping-off means comprising jaws for gripping the lamp assembly, means for moving said gripping jaws into engagement with said lamp assembly, means for heating the lamp assembly to a plastic temperature between said chuck and said gripping jaws, means associated with said gripping jaws for moving the lamp assembly when tipped-off free of said heating means, means for electrically testing the lamp assembly, and means responsive to said test for rendering said tipping-off means effective or ineffective.

20. In an apparatus for manufacturing electric lamps, means for sealing a lamp stem within a bulb to form a lamp assembly, means for evacuating the lamp, means for tipping-off the evacuated lamp by fusing-off the external portion of the stem, means for removing the fused-off portion of the stem, said removing means comprising jaw members, means for supporting said jaw members whereby longitudinal movement thereof will impart lateral movement thereto for gripping the fused-off portion of the stem, and means for moving said jaw members for removing the fused-off portion of the stem.

21. In an apparatus for manufacturing electric lamps, means for sealing a lamp stem within a bulb to form a lamp assembly, means for evacuating the lamp, means for tipping-off the evacuated lamp by fusing-off the external portion of the stem, means for removing the fused-off portion of the stem, said removing means comprising jaw members, means for supporting said jaw members whereby longitudinal movement thereof will impart lateral movement thereto for gripping the fused-off portion of the stem, means for moving said jaw members for removing the fused-off portion of the stem, and means for rendering said removing means ineffective.

22. In an apparatus for manufacturing electric lamps, means for sealing a lamp stem within a bulb, means for electrically testing the lamp thus formed, means for removing the lamp if defective comprising jaw members having transversely extending slots therein, means disposed in said slots for supporting said jaw members and for moving said jaw members relative to each other when longitudinal movement is imparted thereto, and means for moving said jaw members.

23. In an apparatus for manufacturing electric lamps, a chuck for receiving a bulb, means for assembling a stem in the bulb, means whereby air under pressure may be forced through said chuck for forcing a defective lamp assembly upwardly therefrom, and means for receiving the defective assembly forced from said chuck, said last mentioned means comprising a looped tube through which the lamp assembly is directed first upwardly and then downwardly.

24. In an apparatus for manufacturing electric lamps, means for transferring a lamp assembly from one position to another, means for rendering said transferring means ineffective, and means for removing the lamp assembly from said first position when said transferring means is rendered ineffective.

25. In an apparatus for manufacturing electric lamps, means for transferring a lamp assembly from one position to another, means for rendering said transferring means ineffective, and means for supplying a pressure fluid for ejecting the lamp assembly from the first mentioned position when said transferring means is rendered ineffective.

26. In apparatus for manufacturing electric lamps, a plurality of lamp evacuating tubes, means for inserting a lamp assembly into each of said tubes, and means rendered effective when the lamp inserting means fails to insert a lamp assembly in one of said tubes for closing said tube.

27. In an apparatus for manufacturing electric lamps, a sealing-in unit having means for supporting a lamp stem and means for supporting a bulb during the sealing-in operation, an exhausting unit having means for supporting a sealed-in lamp assembly during the exhausting operation, means for transferring a lamp assembly from the sealing-in unit to the exhausting unit, and means controlled by said transfer mechanism for interrupting the exhausting operation when the transfer mechanism is inoperative.

28. In an apparatus for manufacturing electric lamps, a turret, means for indexing said turret, a plurality of chucks carried by said turret for receiving bulbs and having gripping jaws for supporting lamp stems above the bulbs, a magazine for receiving a plurality of bulbs and having an outlet for the passage of the bulbs singly therethrough, a chute having an inlet positioned out of general alignment with the outlet of said magazine and an outlet positioned above one of the chucks when said turret is at rest, and a reciprocating member for receiving the bulbs singly from the outlet of said magazine and transferring them to the inlet of said chute whereby the bulbs may be fed to said chucks after each indexing movement of said turret, and means for actuating the reciprocating member and simultaneously opening the gripping jaws.

29. A butt-sealing and exhaust machine comprising a sealing-in head for supporting a bulb below an exhaust tube during a butt sealing operation, an exhaust machine having an exhaust port, means for removing a sealed lamp from said head, means for reversing the position of said lamp to dispose the bulb above the exhaust tube and means for positioning said exhaust tube in said exhaust port.

30. A machine for sealing-in and exhausting a lamp having an exhaust tube extending from the bulb portion thereof comprising means for supporting a bulb below an exhaust tube for a sealing operation, means for removing a sealed-in lamp from its position during the sealing-in operation, means for reversing the positions of the bulb and exhaust tube, an exhaust machine having exhaust ports and means for inserting said exhaust tube in an exhaust port.

31. In a lamp sealing-in and exhaust machine the combination with means for intermittently rotating said machine, a movable member, means operable during a rest period of said machine to actuate said member to remove a lamp from said sealing-in machine, means for actuating said member to bodily rotate the lamp about a transverse axis and means for depositing said lamp in said exhaust machine.

32. In a lamp making machine, means for transferring a lamp from one lamp making position to another, said transferring means comprising a pair of lamp gripping jaws interconnected by a rack and pinion mechanism by which a movement of one of said jaws causes a corresponding movement of the other jaw, and means for operating said rack and pinion mechanism to open and close said jaws.

VICTOR H. VAN SANT.